US010387995B2

(12) United States Patent
Yamamoto et al.

(10) Patent No.: US 10,387,995 B2
(45) Date of Patent: Aug. 20, 2019

(54) SEMICONDUCTOR DEVICE, ELECTRONIC APPARATUS, AND IMAGE PROCESSING METHOD

(71) Applicant: Renesas Electronics Corporation, Koutou-ku, Tokyo (JP)

(72) Inventors: Akihiro Yamamoto, Tokyo (JP); Hiroyuki Hamasaki, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/647,805

(22) Filed: Jul. 12, 2017

(65) Prior Publication Data

US 2017/0308991 A1 Oct. 26, 2017

Related U.S. Application Data

(63) Continuation of application No. 15/296,539, filed on Oct. 18, 2016, now Pat. No. 9,721,323, which is a (Continued)

(30) Foreign Application Priority Data

Apr. 25, 2012 (JP) ................. 2012-100282

(51) Int. Cl.
*G06T 3/00* (2006.01)
*G06K 9/52* (2006.01)
(Continued)

(52) U.S. Cl.
CPC ............. *G06T 3/0006* (2013.01); *G06K 9/52* (2013.01); *G06T 3/0087* (2013.01); *G06T 3/40* (2013.01);
(Continued)

(58) Field of Classification Search
CPC ............... G06T 3/0087; G06T 7/73; G06T 2207/20172; G06T 5/006; G06T 3/60;
(Continued)

(56) References Cited

U.S. PATENT DOCUMENTS 4,837,844 A 6/1989 Urushibata
4,975,977 A 12/1990 Kurosu et al.
(Continued)

FOREIGN PATENT DOCUMENTS

JP 10-271490 A 10/1998

OTHER PUBLICATIONS

Office Action dated Feb. 26, 2016, in Chinese Patent Application No. 2013101634620.
(Continued)

*Primary Examiner* — Yon J Couso
(74) *Attorney, Agent, or Firm* — Shapiro, Gabor and Rosenberger, PLLC

(57) ABSTRACT

A semiconductor device 1 includes an image input unit 11 and an image output unit 12. The image input unit 11 receives first image data from a camera 91 and outputs second image data to a memory unit 93 through a shared bus 130. The image output unit 12 receives the second image data stored in the memory unit 93 through the shared bus 130 and outputs third image data to a monitor 92. The third image data is generated by performing an affine-conversion on the first image data. Magnification processing in the affine-conversion is not performed in the image input unit 11. In this way, it is possible to provide an excellent semiconductor device suitable for image processing or the like.

11 Claims, 27 Drawing Sheets

Related U.S. Application Data continuation of application No. 14/984,386, filed on Dec. 30, 2015, now abandoned, which is a continuation of application No. 13/846,270, filed on Mar. 18, 2013, now Pat. No. 9,245,313.

(51) Int. Cl.
| | |
|---|---|
| *G06T 3/40* | (2006.01) |
| *G06T 5/00* | (2006.01) |
| *G06T 7/60* | (2017.01) |
| *G06T 7/73* | (2017.01) |
| *G06T 3/60* | (2006.01) |
| *H04N 7/18* | (2006.01) |
| *G06K 9/46* | (2006.01) |

(52) U.S. Cl.
CPC ............... *G06T 3/60* (2013.01); *G06T 5/006* (2013.01); *G06T 7/60* (2013.01); *G06T 7/73* (2017.01); *H04N 7/18* (2013.01); *G06K 2009/4666* (2013.01); *G06T 2207/20172* (2013.01)

(58) Field of Classification Search
CPC .......... G06T 3/40; G06T 7/60; G06T 3/0006; G06K 2009/4666; G06K 9/52; H04N 7/18

See application file for complete search history.

(56) References Cited

U.S. PATENT DOCUMENTS

| | | | | |
|---|---|---|---|---|
| 5,161,013 | A | * | 11/1992 | Rylander ............... G09G 3/002 345/419 |
| 2002/0048410 | A1 | | 4/2002 | So et al. |
| 2002/0063807 | A1 | * | 5/2002 | Margulis .................. G06T 1/20 348/745 |
| 2009/0041378 | A1 | * | 2/2009 | Yamaoka ................ G06T 5/006 382/275 |
| 2011/0129154 | A1 | * | 6/2011 | Shimodaira ............... G06T 7/80 382/190 |

OTHER PUBLICATIONS

Office Action dated Jul. 26, 2016, in Chinese Patent Application No. 2013101634620.

\* cited by examiner

SEMICONDUCTOR DEVICE, ELECTRONIC APPARATUS, AND IMAGE PROCESSING METHOD

CROSS-REFERENCE TO RELATED APPLICATIONS

This application is based upon and claims the benefit of priority from Japanese patent application No. 2012-100282, filed on Apr. 25, 2012, the disclosure of which is incorporated herein in its entirety by reference.

BACKGROUND

The present invention relates to a semiconductor device, an electronic apparatus, and an image processing method, and can be suitably used for, for example, a semiconductor device that performs image processing, an electronic circuit, and an image processing method.

In recent years, a technique for providing information to a driver by using a vehicle-mounted camera(s) has been spreading. As a typical technique, a back-guide monitor using a camera disposed in the rear of a vehicle and an around-view monitor that combines images from cameras mounted at the four corners of a vehicle have been known.

In general, a lens with which a wide-range image can be taken is used as a lens for such vehicle-mounted cameras. Therefore, if a lens having poor performance is used, a taken image is distorted. Accordingly, it is necessary to correct a distortion(s) on an image taken by a vehicle-mounted camera.

For example, Japanese Unexamined Patent Application Publication No. 10-271490 discloses a technique for correcting an image taken by a CCD camera disposed in the rear of a vehicle.

SUMMARY

The inventors of the present application have found various problems to be solved in the development of semiconductor devices. Each embodiment disclosed in the present application provides, for example, a semiconductor device suitable for image processing or the like. Detailed features of the present invention will become obvious from the following descriptions of this specification and the attached drawings.

A first aspect of the present invention is a semiconductor device including: an image input unit that receives first image data from an image-taking device and outputs second image data to a storage unit through a data bus; and an image output unit that receives the second image data stored in the storage unit through the data bus and outputs third image data to an image display device. The third image data is generated by performing an affine-conversion on the first image data. Further, magnification processing in the affine-conversion is not performed in the image input unit.

According to an embodiment of the present invention, it is possible to provide, for example, an excellent semiconductor device suitable for image processing or the like.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Specific embodiments in which the present invention is applied are explained hereinafter in detail with reference to the drawings. The same symbols are assigned to the same or corresponding components throughout the drawings, and their duplicated explanation is omitted as appropriate for clarifying the explanation.

<Outline of Distortion Correction Processing>

Figure 1:
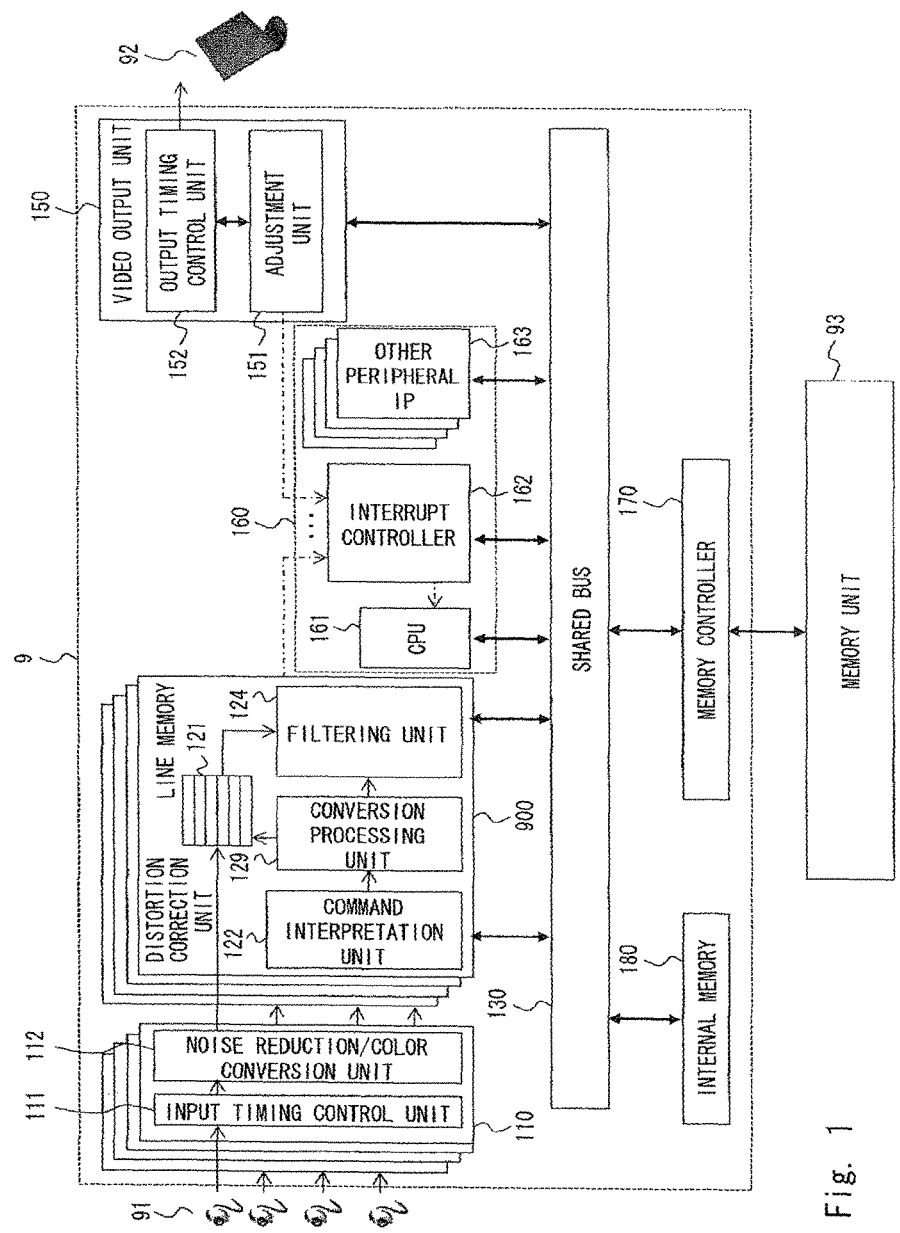
FIG. 1 is a detailed block diagram of a semiconductor device according to a comparative example.
Figure 2A:
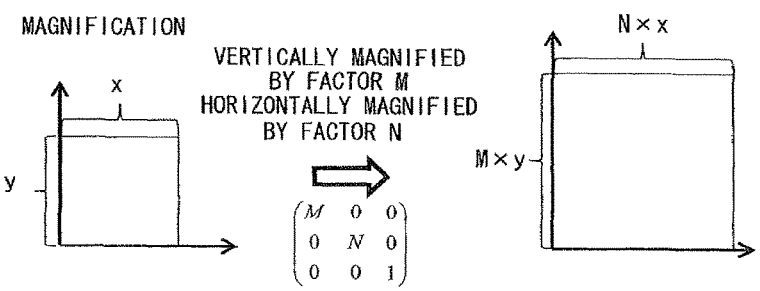
FIG. 2A is a drawing for explaining parameters of transformation matrixes in affine-conversions.
Figure 2B:
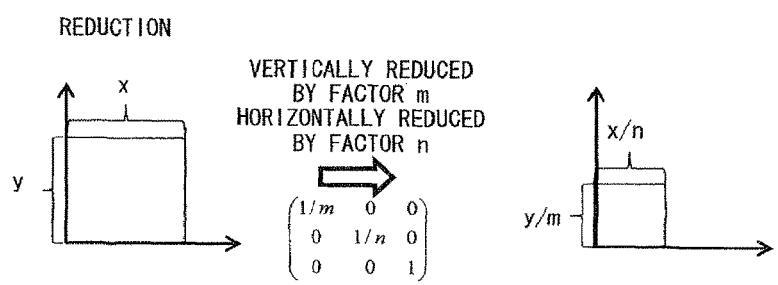
FIG. 2B is a drawing for explaining parameters of transformation matrixes in affine-conversions.
Figure 2C:
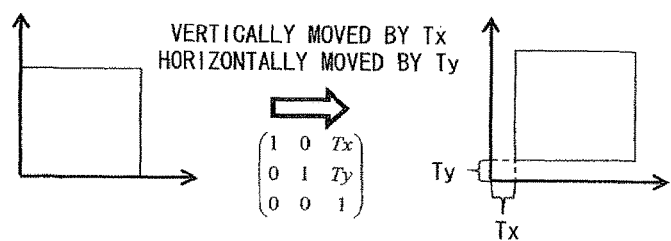
FIG. 2C is a drawing for explaining parameters of transformation matrixes in affine-conversions.
Figure 2D:
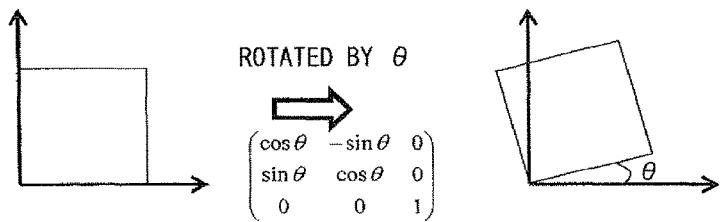
FIG. 2D is a drawing for explaining parameters of transformation matrixes in affine-conversions.
Figure 2E:
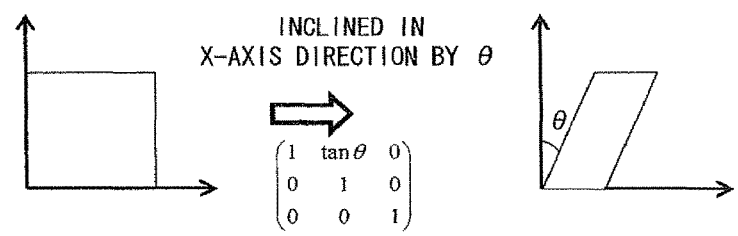
FIG. 2E is a drawing for explaining parameters of transformation matrixes in affine-conversions.
Figure 2F:
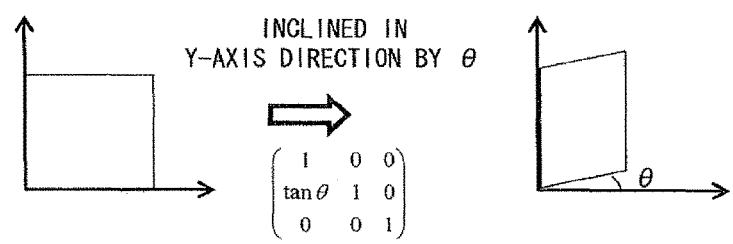
FIG. 2F is a drawing for explaining parameters of transformation matrixes in affine-conversions.

FIG. 1 shows a block diagram of a semiconductor device 9 according to a comparative example that the inventors of the present application have examined. The semiconductor device 9 corrects a distortion (s) on image data taken in from an external camera 91 and displays the corrected image on an external monitor 92.

The semiconductor device 9 includes a video input unit 110, a distortion correction unit 900, a shared bus 130, a video output unit 150, a control unit 160, a memory controller 170, and an internal memory 180.

<Configuration of Video Input Unit 110>

The video input unit 110 includes an input timing control unit 111 and a noise reduction/color conversion unit 112. The input timing control unit 111 obtains image data generated by the cameras 91 and controls the timing at which the obtained image data is output to a processing unit located at the subsequent stage. That is, the input timing control unit 111 outputs the obtained image data at a timing that is determined according to the operation clock of the distortion correction unit 900.

The noise reduction/color conversion unit 112 removes noises from the image data output from the input timing control unit 111. As the noise reduction processing performed in the noise reduction/color conversion unit 112, well-known techniques such as filter processing and smoothing can be used. Further, the noise reduction/color conversion unit 112 performs, for example, a process for converting color information expressed in YUV into color information expressed in RGB and the like.

Note that in the specific example shown in FIG. 1, a case where the semiconductor device 9 performs distortion correction processing for each of four image data taken by the four cameras 91 is shown. The cameras 91 are, for example, cameras that are disposed at the four corners of a vehicle. In the case of an around-view monitor, it is necessary to take images of the entire circumference around the vehicle (360°) by using four cameras. Therefore, each of the cameras 91 is equipped with a wide-angle lens. Further, in consideration of the reduction in the cost of the cameras 91, it is difficult to use a high-performance lens having little distortion. Therefore, image data generated by an image-taking process by the cameras 91 becomes image data in which the subject is distorted.

<Configuration of Distortion Correction Unit 900>

The distortion correction unit 900 includes a line memory 121, a command interpretation unit 122, a conversion processing unit 129, and a filtering unit 124. In the line memory 121, pixels of image data supplied from the noise reduction/color conversion unit 112 are stored on a line-by-line basis.

The command interpretation unit 122 reads distortion correction information that is stored in the memory unit 93 in advance through the shared bus 130. Then, the command interpretation unit 122 interprets the read distortion correction information and instructs the conversion processing unit 129 to perform correction processing for the image data stored in the line memory 121. Note that the distortion correction information is information that is used to perform distortion correction for image data stored in the line memory 121. The distortion correction information is, for example, information including a magnification ratio (s) and a reduction ratio (s) of pixels included in image data, addresses of pixels for which magnification/reduction processing should be performed, addresses of pixels of image data before and after the pixels are moved when the pixels are to be moved, and so on.

In response to the instruction from the command interpretation unit 122, the conversion processing unit 129 performs correction processing for the image data stored in the line memory 121. In this embodiment, the conversion processing unit 129 performs distortion correction processing for the image data stored in the line memory 121 by using an affine-conversion. More specifically, the conversion processing unit 129 designates an address of the image data stored in the line memory 121 on a pixel-by-pixel basis based on the distortion correction information and thereby moves pixels (translation processing, rotation processing, and/or sheering processing), deletes pixels (reduction processing), and/or adds pixels (magnification processing).

The filtering unit 124 performs filtering such as a shading process and a linear interpolation process on a plurality of pixels, at a time, included in the image data corrected by the conversion processing unit 129. The plurality of pixels on which the filtering has been performed are stored into the memory unit 93 through the shared bus 130. That is, the distortion correction unit 900 outputs the corrected image data to the memory unit 93 through the shared bus 130 in such a manner that a plurality of pixels are output at a time. Note that the operations for the image data in the memory unit 93 such as reading, writing, and refreshing are controlled by the memory controller 170. Needless to say, a DRAM (Dynamic Random Access Memory), for example, can be used for the memory unit 93 in which image data is stored. Needless to say, the memory unit 93 is not limited to the DRAM. That is, other memory devices such as an SRAM (Static Random Access Memory) can be also used for the memory unit 93. Further, the memory unit 93 may be disposed inside the semiconductor device 1.

Note that the shared bus 130 is a bus that connects the distortion correction unit 900, the video output unit 150, the control unit 160, the internal memory 180, and the memory controller 170. The shared bus 130 is a bus through which image data, distortion correction information, instruction information from the control unit 160, and the like are transmitted.

<Configuration of Control Unit 160>

The control unit 160 includes a CPU (Central Processing Unit) 161, an interrupt controller 162, and a peripheral IP 163.

The CPU 161 makes each unit of the semiconductor device 1 perform various operations based on a control program that is stored in the internal memory 180 in advance. Note that the internal memory 180 is also used as the work area of the CPU 161. For example, an SRAM or the like is used for the internal memory 180.

Interrupt requests that are output in response to the completion of writing of image data performed by the distortion correction unit 900, the completion of display performed by the video output unit 150, and the like are input to the interrupt controller 162. The interrupt controller 162 outputs an interrupt signal to the CPU 161 based on the input interrupt request and controls the processing sequence of the CPU 161.

The peripheral IP 163 is, for example, a communication circuit or the like for performing communication between the semiconductor device 1 and an external device.

<Configuration of Video Output Unit 150>

The video output unit 150 includes an adjustment unit 151 and an output timing control unit 152. The adjustment unit 151 adjusts colors and the like of image data read from the memory unit 93 through the shared bus 130. Specifically, the adjustment unit 151 performs a brightness correction process, a gamma correction process, a dithering process, and the like for the input image data, and thereby adjusts the colors of an image(s) to be displayed on the monitor 92.

The output timing control unit 152 controls a timing at which distortion-corrected image data is output to the monitor 92. That is, the output timing control unit 152 outputs distortion-corrected image data at a timing that is determined according to the operation clock of the monitor 92 and thereby displays the distortion-corrected image on the monitor 92.

<Explanation of Affine-conversion>

An affine-conversion of image data performed in the distortion correction unit 900 is explained hereinafter in detail. The distortion correction processing is performed by performing five processes, i.e., magnification processing, reduction processing, translation processing, rotation processing, and sheering processing on image data. The affine-conversion is a geometric conversion of image data that is performed by performing these correction processes by using matrix calculation.

In general, the affine-conversion is performed by matrix calculation as shown as Expression (1) shown below. Note that the coordinates of a pixel before the affine-conversion are represented as "(x, y)" and the coordinates of the pixel after the affine-conversion are represented as "(x', y')". The coordinates after the conversion (x', y') are calculated by multiplying the coordinates before the conversion (x, y) by a transformation matrix. By setting values of a to f (parameters) in the transformation matrix, it is possible to implement the above-described magnification processing, reduction processing, translation processing, rotation processing, and sheering processing.

[Expression 1]

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad (1)$$

Specific values for a to f in each correction processing are shown in FIGS. 2A to 2F. FIGS. 2A to 2F show transformation matrixes necessary for the correction processing and states of image data before and after the correction processing.

Further, in the affine-conversion, the magnification processing, reduction processing, translation processing, rotation processing, and sheering processing can be performed by one matrix operation. Specifically, a plurality of types of correction processes can be performed by one matrix operation by generating one transformation matrix by combining transformation matrixes shown in FIGS. 2A) to 2F and then performing the operation of Expression (1) by using the generated transformation matrix.

Figure 3:
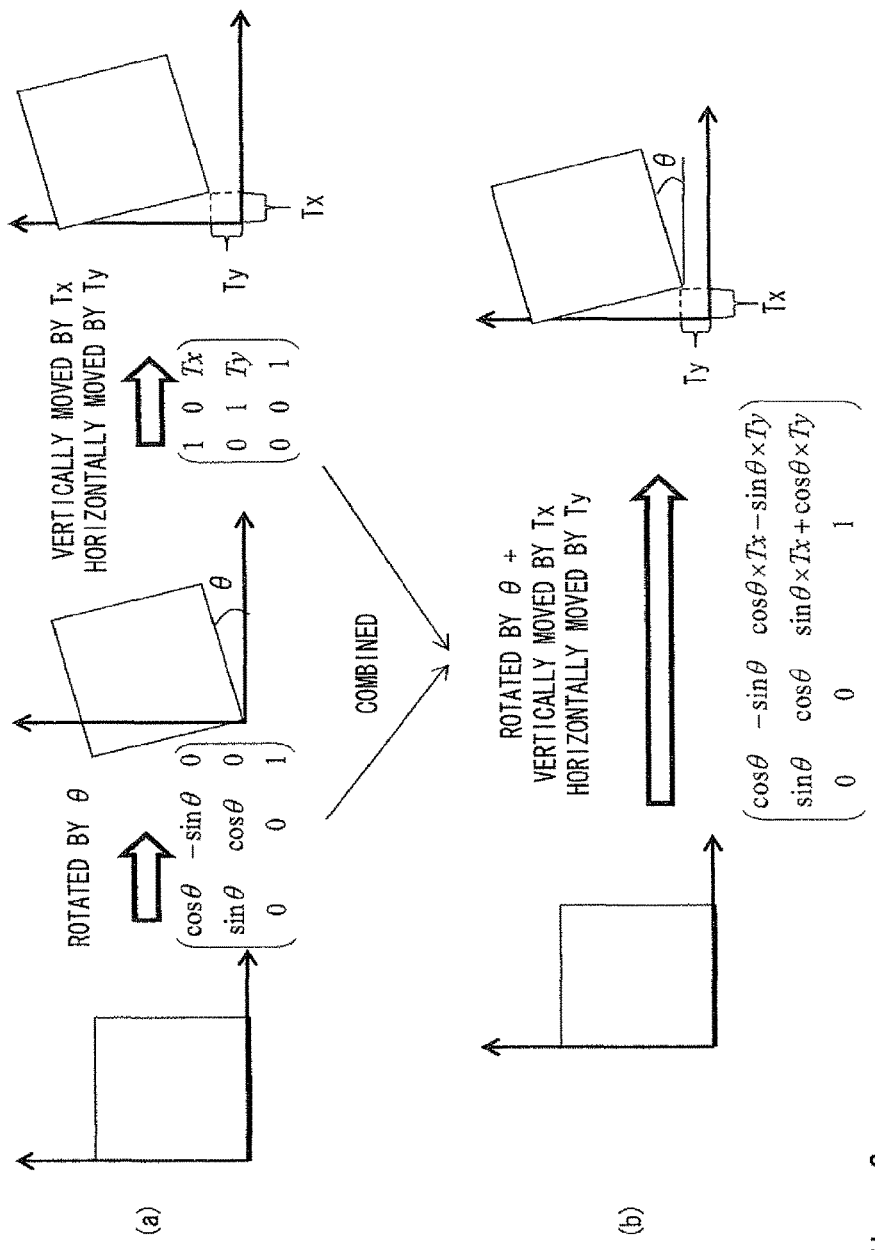
FIG. 3 is a drawing for explaining a combining process of transformation matrixes in an affine-conversion.

As an example, a case where rotation processing and translation processing are performed by using an affine-conversion is explained with reference to FIG. 3. As shown in FIG. 3(*a*), firstly, image data on which the conversion has not yet been performed is multiplied by a transformation matrix for performing rotation processing. After that, the image data on which the rotation processing has been performed is multiplied by a transformation matrix for performing translation processing. In this way, the rotation processing and the translation processing can be performed.

In this case, two matrix operations, i.e., the matrix operation for the rotation processing and the matrix operation for the translation processing are performed.

In contrast to this, as shown in FIG. 3(*b*), one transformation matrix is generated in advance by combining a transformation matrix for performing rotation processing with a transformation matrix for performing translation processing. Then, image data on which the conversion has not yet been performed may be multiplied by the combined transformation matrix. In this way, a plurality of types of correction processes can be performed by one matrix operation.

Figure 4:
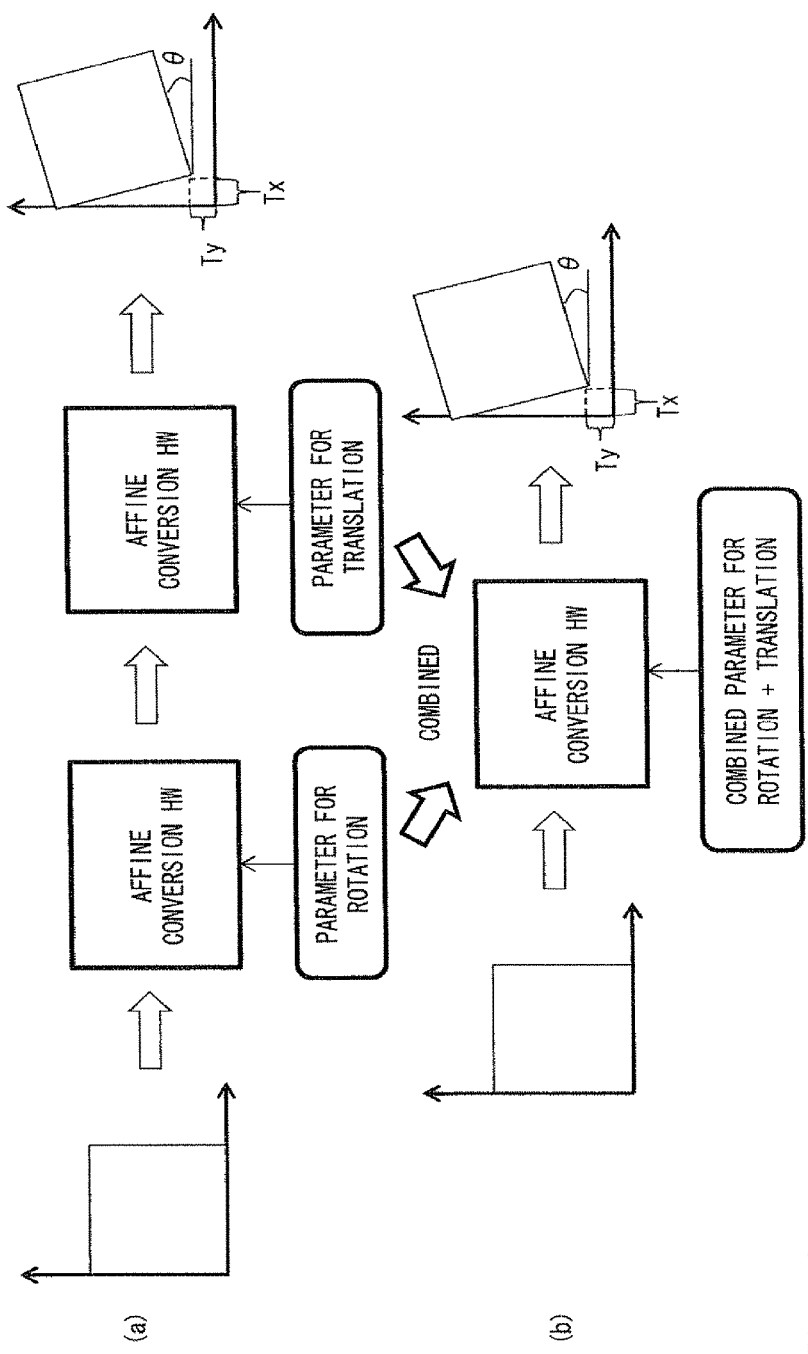
FIG. 4 is a drawing for explaining a combining process of transformation matrixes in an affine-conversion.

That is, the correction processing shown in FIG. 3(*a*) requires affine-conversion hardware and parameters (transformation matrix) for the rotation processing and affine-conversion hardware and parameters (transformation matrix) for the translation processing (see FIG. 4(*a*)). In contrast to this, the correction processing shown in FIG. 3(*a*) requires only one affine-conversion hardware and only one set of parameters (combined transformation matrix) (see FIG. 4(*b*)). Therefore, the affine-conversion using the combined transformation matrix can reduce the number of necessary hardware devices and the number of parameters and reduce the processing burden for the matrix operation in comparison to the affine-conversion in which each correction processing is separately performed. For these reasons, in general, the affine-conversion for distortion correction processing is performed by one matrix operation in one place by using a transformation matrix that is obtained by combining a plurality of correction processes.

Similarly, the above-described semiconductor device 9 combines transformation matrixes for performing magnification processing, reduction processing, translation processing, rotation processing, and sheering processing in advance, and thereby performs the affine-conversion in one place (distortion correction unit 900) by using the combined transformation matrix.

<Operation Example of Semiconductor Device 9>

Figure 5:
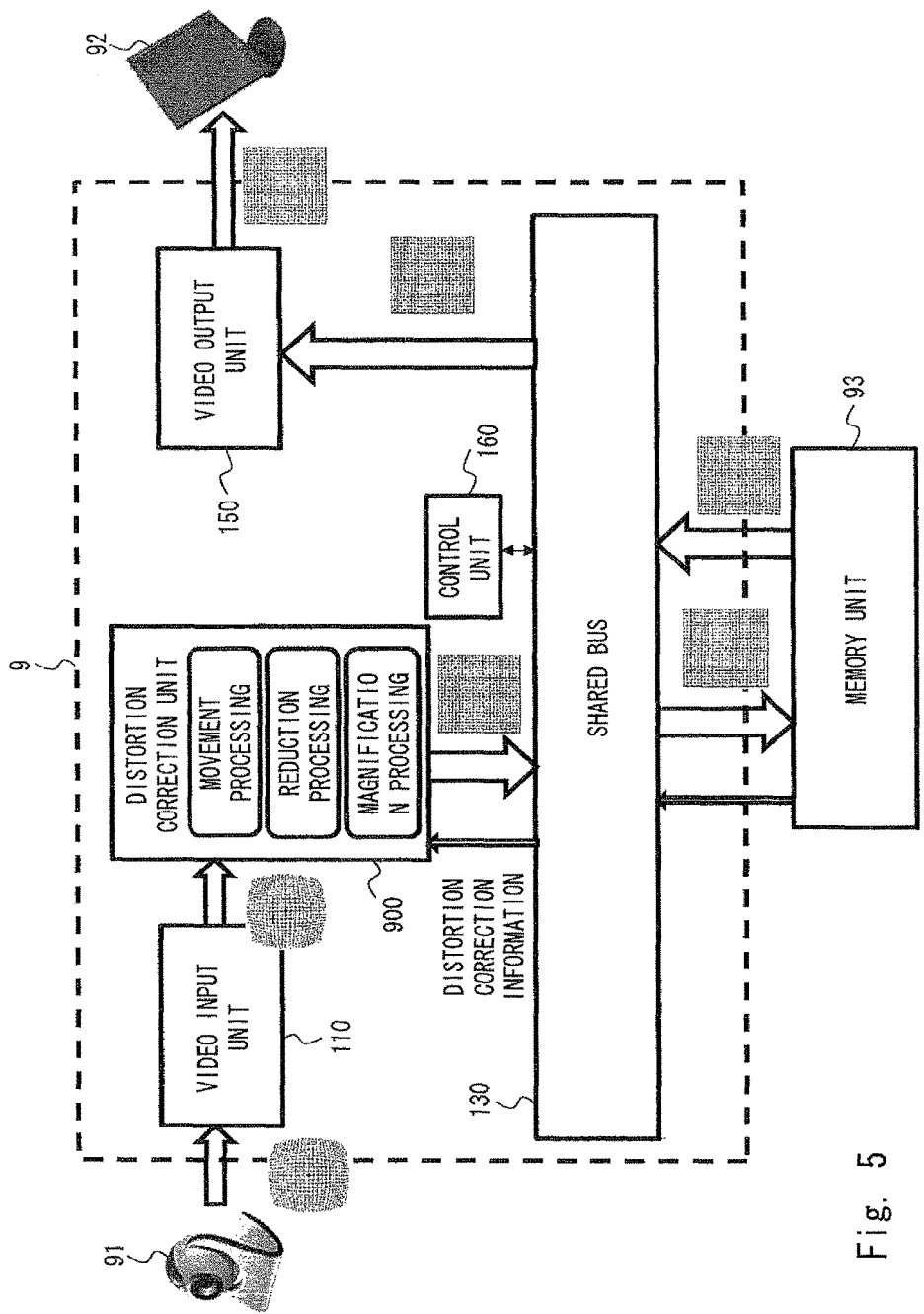
FIG. 5 is a block diagram of a semiconductor device according to a comparative example.

Next, an operation of the semiconductor device 9 is explained. Note that for the sake of explanation, FIG. 5 shows a simplified block diagram of the block diagram shown in FIG. 1. The block diagram shown in FIG. 5 also shows a state of image data output from each block. Note that as shown in FIG. 5, among the correction processes included in the affine-conversion, the translation processing, rotation processing, and sheering processing may be also collectively referred to as "movement processing" in the following explanation.

Figure 6:
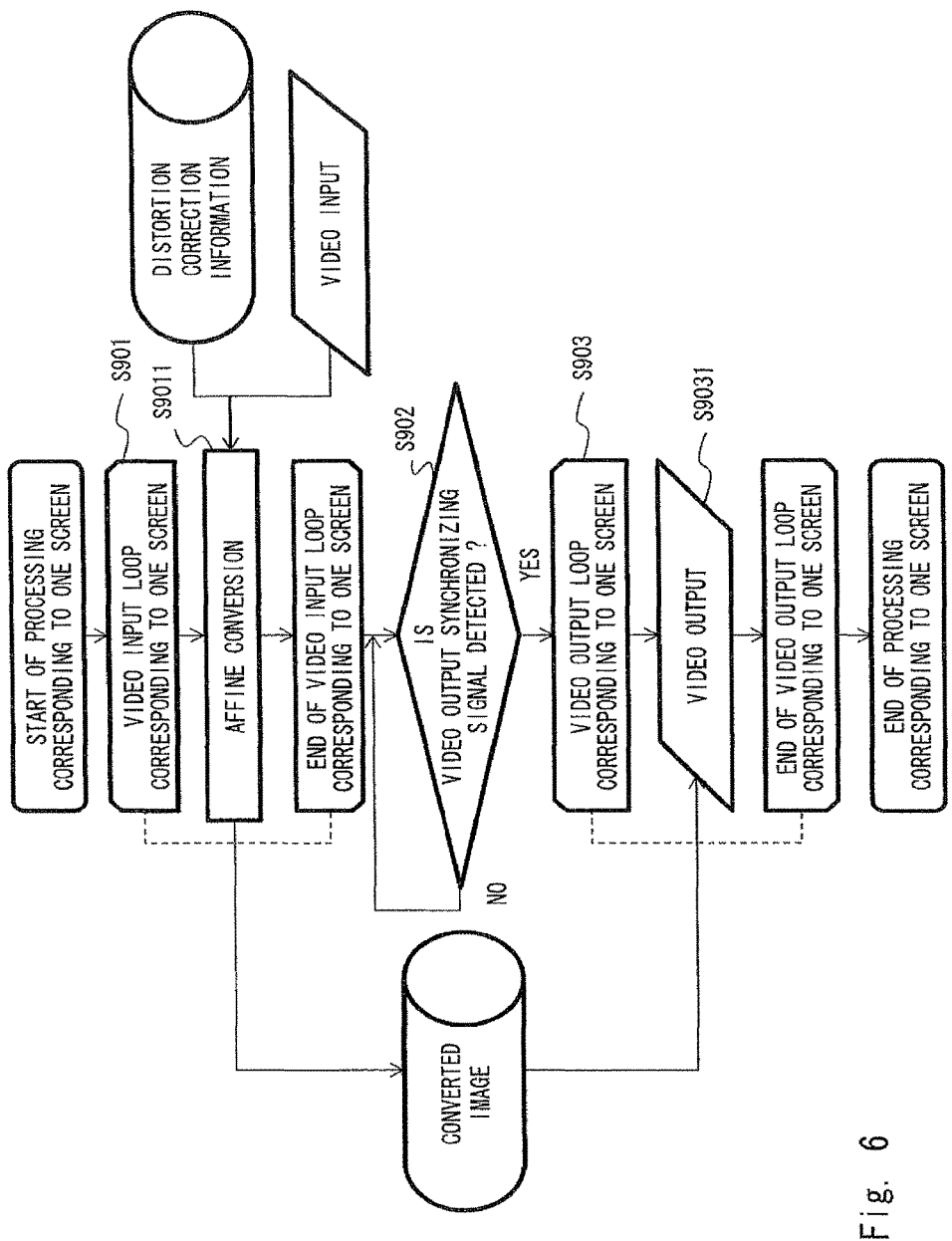
FIG. 6 is a flowchart showing an operation example of a semiconductor device according to a comparative example.

Further, FIG. 6 shows a flowchart showing an operation example of the semiconductor device 9. FIG. 6 shows processing that is performed for image data corresponding to one screen (one frame) input from the cameras 91. Therefore, in order to display moving images on the monitor 92 by using image data corresponding to a plurality of frames, the flow shown in FIG. 6 needs to be repeated.

Figure 7:
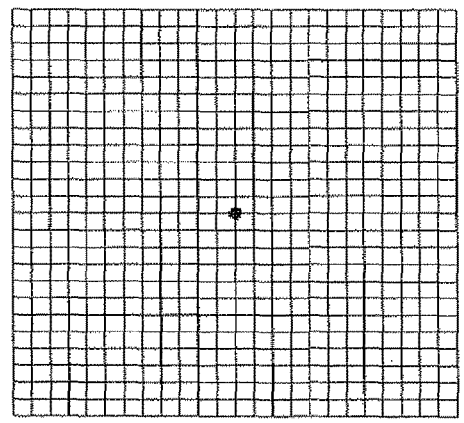
FIG. 7 is a drawing for explaining a process of distortion correction processing according to a comparative example.
Figure 7:
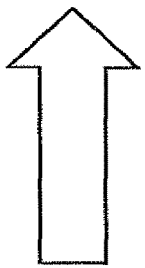
Figure 7:
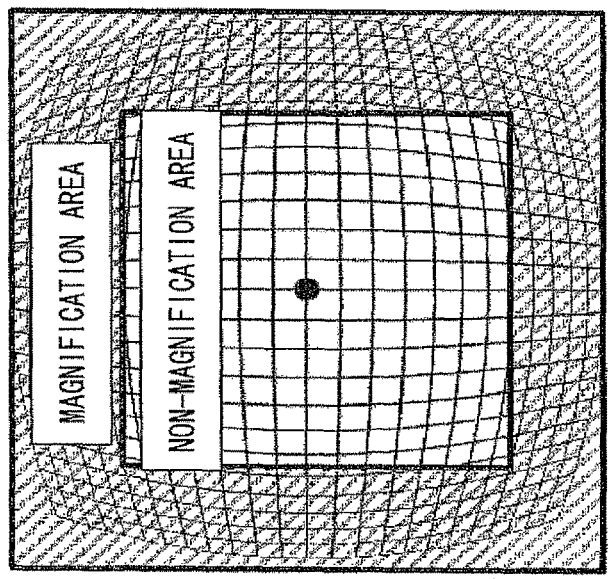

Note that the following explanation is made on the assumption that the subject is an object in which square shapes are arranged in a lattice pattern. FIG. 7 shows image data that changes by distortion correction processing. FIG. 7(*a*) shows image data on which distortion correction has not yet been made. FIG. 7(*b*) shows image data on which distortion correction processing has been performed by the distortion correction unit 900.

Further, assume that the lens of the camera 91 is a fish-eye lens. Therefore, image data taken by the camera(s) 91 (image data before distortion correction) is distorted image data as shown in FIG. 7(*a*). Note that in the image data shown in FIG. 7(a), an area for which magnification processing should be performed in order to correct the distortion (hatched area in FIG. 7(a)) and a non-magnification area (area for which reduction processing should be performed) are unevenly located. Specifically, the hatched area in FIG. 7(a) (peripheral area of image data) is a magnification area (first area) and the other area (central area of image data) is a non-magnification area (second area). The rectangular non-magnification area is surrounded by the magnification area.

Firstly, image data generated by an image-taking process by the camera 91 is input to the video input unit 110. At this point, the image data is distorted image data as shown in FIG. 7(a) (see FIG. 5).

The video input unit 110 performs noise reduction processing, color conversion processing, and the like for the input image data and outputs the processed image data to the distortion correction unit 900. Since no distortion correction processing is performed in the video input unit 110, the image data is still distorted image data at this point (see FIG. 5).

The distortion correction unit 900 performs a video input loop for the input image data corresponding to one screen (step S901). In the video input loop, the distortion correction unit 900 performs an affine-conversion for the input image data (step S9011). More specifically, the distortion correction unit 900 performs reduction processing, magnification processing, and movement processing (translation processing, rotation processing, and sheering processing) for the image data input from the video input unit 110 based on distortion correction information that is stored in the memory unit 93 in advance. As a result, distortion-corrected image data (FIG. 7(b)) is generated. The distortion correction unit 900 stores the distortion-corrected image data into the memory unit 93 through the shared bus 130 (see FIG. 5).

Next, an operation of the video output unit 150 is explained. The video output unit 150 detects whether or not a synchronizing signal for video output has been input (step S902). When the video output unit 150 detects that a synchronizing signal for video output has been input (step S902: Yes), the video output unit 150 performs a video output loop corresponding to one screen (step S903). In the video output loop in the step S903, the video output unit 150 reads the distortion-corrected image data stored in the memory unit 93 through the shared bus 130 in such a manner that a plurality of pixels are read at a time, and makes the monitor 92 display distortion-corrected image data based on the read image data (step S9031). That is, the image data output from the distortion correction unit 900 (distortion-corrected image data shown in FIG. 7(b)) is displayed on the monitor 92 without undergoing any affine-conversion (distortion correction processing) after being output from the shared bus 130. Through the above-described processes, the distortion correction processing corresponding to one screen has been finished.

As described above, in the configuration of the semiconductor device 9, the affine-conversion including the reduction processing and magnification processing is performed for the image data input from the cameras 91 in the preliminary stage in which the image data is transmitted through the shared bus 130.

<Explanation of Processing Burden for Reduction Processing/Magnification Processing>

Four example cases are shown below for explaining the processing burden for the reduction processing and magnification processing included in the distortion correction processing.

Figure 8:
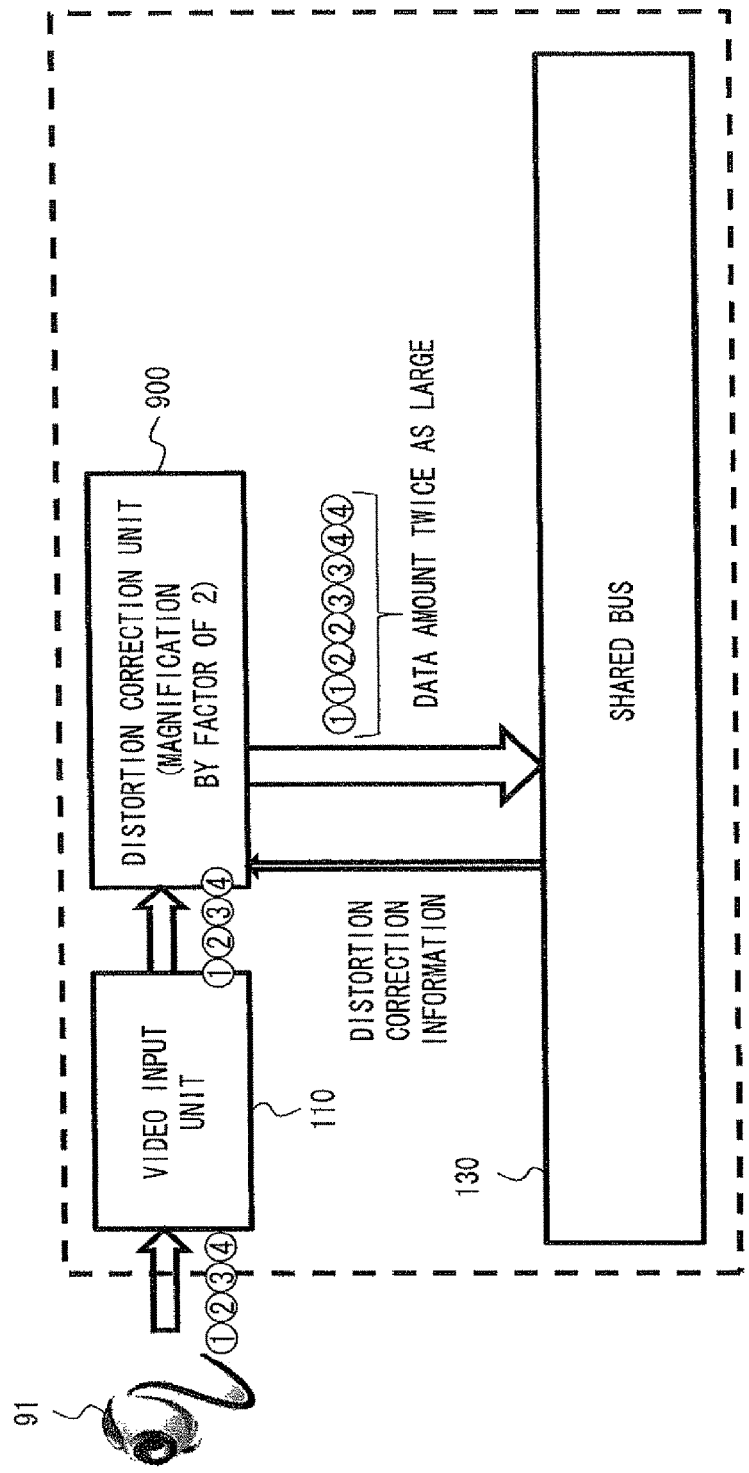
FIG. 8 is a block diagram for explaining a processing burden of magnification processing in an input unit.
Figure 9:
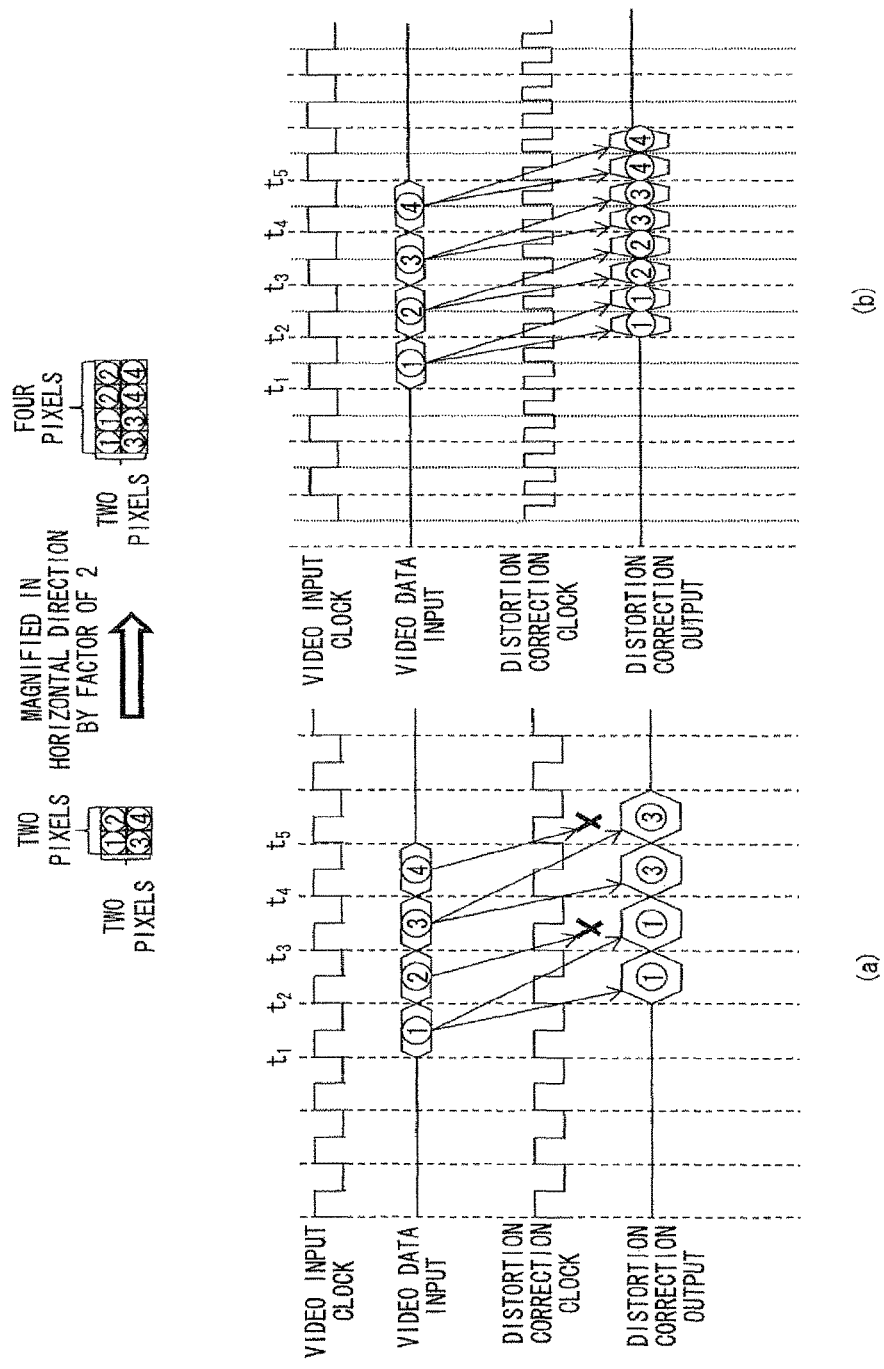
FIG. 9 is a timing chart for explaining a processing burden of magnification processing in an input unit.

Firstly, as shown in a block diagram shown in FIG. 8, a case where magnification processing is performed on image data immediately after the video input unit 110 and the processed image data is output to the shared bus 130 is explained. In the case shown in FIG. 8, image data (Pixels 1 to 4) output from the video input unit 110 is magnified to a data amount twice as large as the original data amount in the distortion correction unit 900. FIG. 9 shows a timing chart for the case shown in FIG. 8. FIG. 9(a) is a timing chart for a case where the frequency of the video input clock (operation clock of video input unit 110) is equal to that of the distortion correction clock (operation clock of distortion correction unit 900). FIG. 9(b) is a timing chart for a case where the frequency of the distortion correction clock is twice as high as that of the video input clock. Note that in the following explanation, the term "video input data" means pixels that are input from the camera 91 to the video input unit 110. Further, the term "distortion correction output" means pixels which are output from the distortion correction unit 900 and on which magnification processing has been already performed.

Firstly, the case where the frequency of the video input clock is equal to that of the distortion correction clock is explained with reference to FIG. 9(a). Pixels 1 to 4 included in image data generated by the camera 91 are input to the video input unit 110 in synchronization with the video input clock. Specifically, Pixel 1 is input at a time t1 and Pixel 2 is input at a time t2. Further, Pixel 3 is input at a time t3 and Pixel 4 is input at a time t4. Note that since the image-taking process by the camera 91 is continuously performed (moving images are taken), image data is continuously input from the camera 91 to the video input unit 110.

Meanwhile, the distortion correction unit 900 performs magnification processing in synchronization with the distortion correction clock. Assume that the distortion correction unit 900 can process (perform magnification processing) one pixel at each clock. Therefore, the distortion correction unit 900 requires two clocks for a process for magnifying one Pixel 1 to two Pixels 1. That is, the distortion correction unit 900 processes Pixel 1 at the times t2 and t3.

Next, the distortion correction unit 900 needs to perform magnification processing for Pixel 2. Pixel 2 is input to the distortion correction unit 900 at the time t3. However, since the distortion correction unit 900 is still processing Pixel 1 at the time t3, the distortion correction unit 900 cannot process Pixel 2.

Further, the distortion correction unit 900 performs magnification processing for the input Pixel 3 at the time t4. Since the magnification processing for Pixel 3 also requires two clocks, the distortion correction unit 900 cannot process Pixel 4 that is input at a time t5. That is, when the frequency of the video input clock is equal to that of the distortion correction clock, the distortion correction unit 900 cannot process Pixels 2 and 4.

In contrast to this, the case where the frequency of the distortion correction clock is twice as high as that of the video input clock is explained with reference to FIG. 9(b). In a period between a time t2 and t3, the distortion correction clock advances two clocks while the video input clock advances one clock. Therefore, the distortion correction unit 900 can complete the magnification processing for Pixel 1 in the period between the time t2 and t3. As a result, the distortion correction unit 900 can also perform the magnification processing for Pixel 2 in a period between a time t3 and t4. After that, the distortion correction unit 900 can also magnify one pixel to two pixels in a period in which the video input clock advances one clock in a similar manner.

Therefore, when the frequency of the distortion correction clock is twice as high as that of the video input clock, the distortion correction unit 900 can perform magnification processing for all of Pixels 1 to 4.

As described above, in the case where magnification processing is performed on image data immediately after the video input unit 110 (immediately before shared bus 130) and the processed image data is output to the shared bus 130, in order to implement the magnification processing, it is necessary that the frequency of the distortion correction clock is higher than that of the video input clock or necessary that a plurality of pixels can be simultaneously output in one cycle (clock) for each input pixel. Therefore, the distortion correction unit 900 needs to have high performance.

Figure 10:
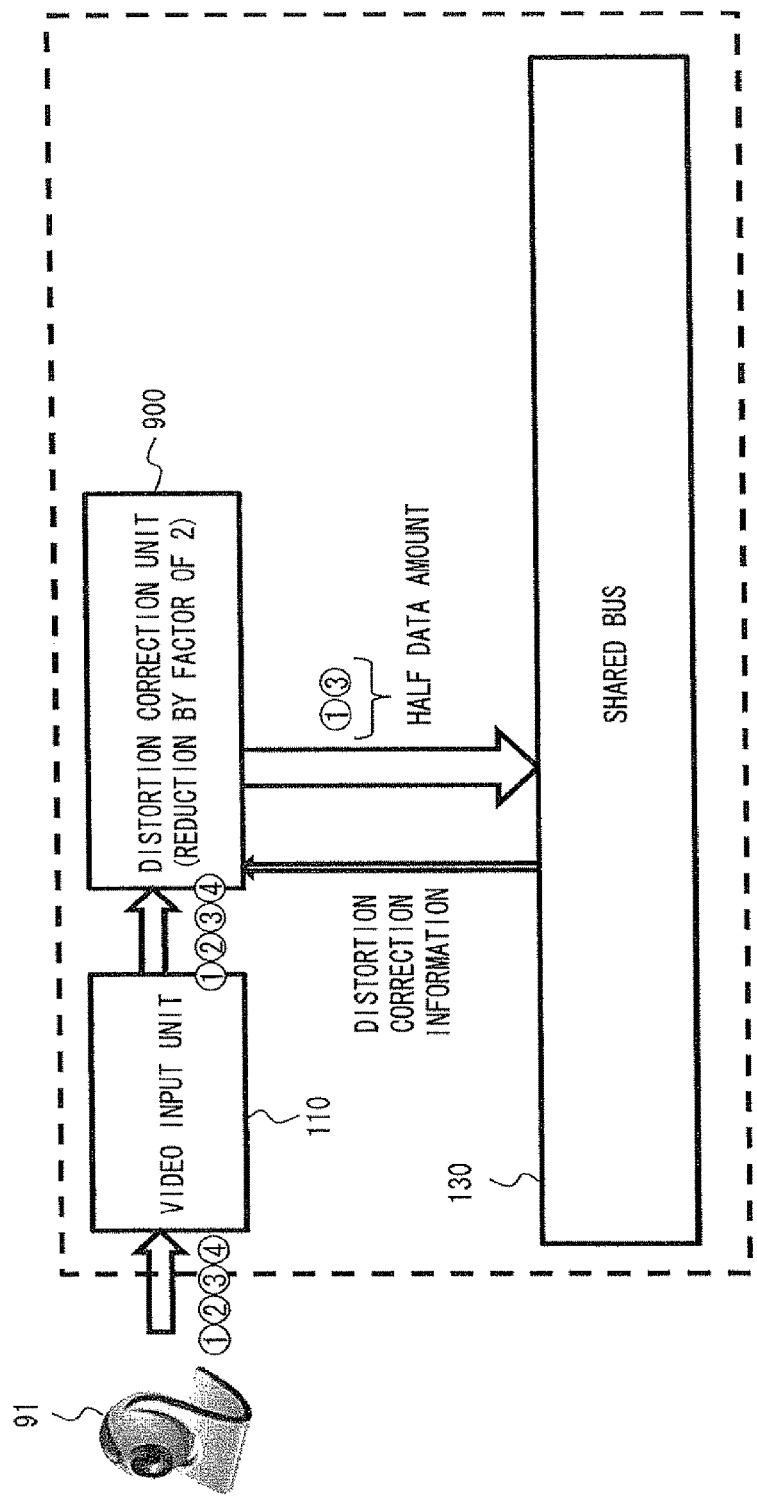
FIG. 10 is a block diagram for explaining a processing burden of reduction processing in an input unit.
Figure 11:
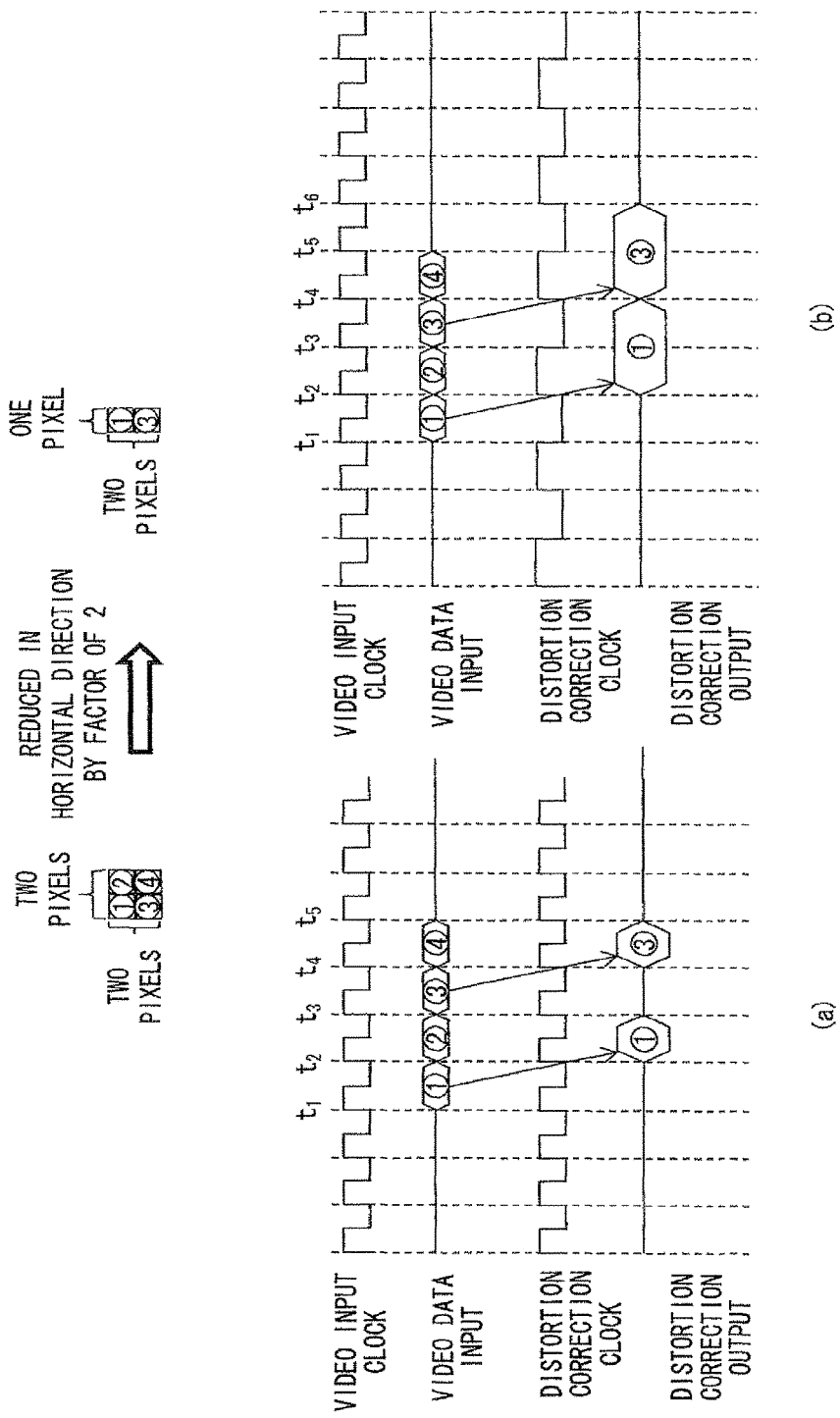
FIG. 11 is a timing chart for explaining a processing burden of reduction processing in an input unit.

Next, as shown in a block diagram shown in FIG. 10, a case where reduction processing is performed on image data immediately after the video input unit 110 and the processed image data is output to the shared bus 130 is explained. In the case shown in FIG. 10, image data (Pixels 1 to 4) output from the video input unit 110 is reduced to a half data amount (Pixels 1 and 3) in the distortion correction unit 900. FIG. 11 shows a timing chart for the case shown in FIG. 10. FIG. 11(*a*) is a timing chart for a case where the frequency of the video input clock is equal to that of the distortion correction clock. FIG. 11(*b*) is a timing chart for a case where the frequency of the distortion correction clock is half the frequency of the video input clock.

Firstly, the case where the frequency of the video input clock is equal to that of the distortion correction clock is explained with reference to FIG. 11(*a*). Similarly to FIG. 9(*a*), Pixels 1 to 4 included in image data generated by the camera 91 are input to the video input unit 110 in synchronization with the video input clock.

The distortion correction unit 900 should only process one pixel (Pixel 1) in a period in which two pixels (Pixels 1 and 2) are input from the video input unit 110. Since the processing for Pixel 1, which is input to the distortion correction unit 900 at a time t2, is completed at a time t3, a spare time occurs between the time t3 and t4. Then, the distortion correction unit 900 processes Pixel 3 between the times t4 and t5. That is, when the frequency of the video input clock is equal to that of the distortion correction clock, the distortion correction unit 900 can perform the process for reducing Pixels 1 to 4 to Pixels 1 and 3.

In contrast to this, the case where the frequency of the distortion correction clock is half the frequency of the video input clock is explained with reference to FIG. 11(*b*). In this case, the distortion correction clock advances only one clock in a period in which the video input clock advances two clocks. Therefore, the distortion correction unit 900 can process only Pixel 1 in the period in which Pixels 1 and 2 are input (time t2 to t4). Similarly, the distortion correction unit 900 can process only Pixel 3 in the period in which Pixels 3 and 4 are input (time t4 to t6). However, Pixels 2 and 4 are pixels that should be deleted by the reduction processing in the first place. That is, even when the frequency of the distortion correction clock is half the frequency of the video input clock, the distortion correction unit 900 can perform the process for reducing Pixels 1 to 4 to Pixels 1 and 3.

As described above, in the case where reduction processing is performed on image data immediately after the video input unit 110 shown in FIG. 10 (immediately before shared bus 130) and the processed image data is output to the shared bus 130, the reduction processing can be implemented even when the frequency of the distortion correction clock is lower than that of the video input clock or when a plurality of cycles (clock) are required for each input pixel. Therefore, the distortion correction unit 900 does not need to have high performance. That is, the distortion correction unit 900 can perform the processing with low processing performance.

Figure 12:
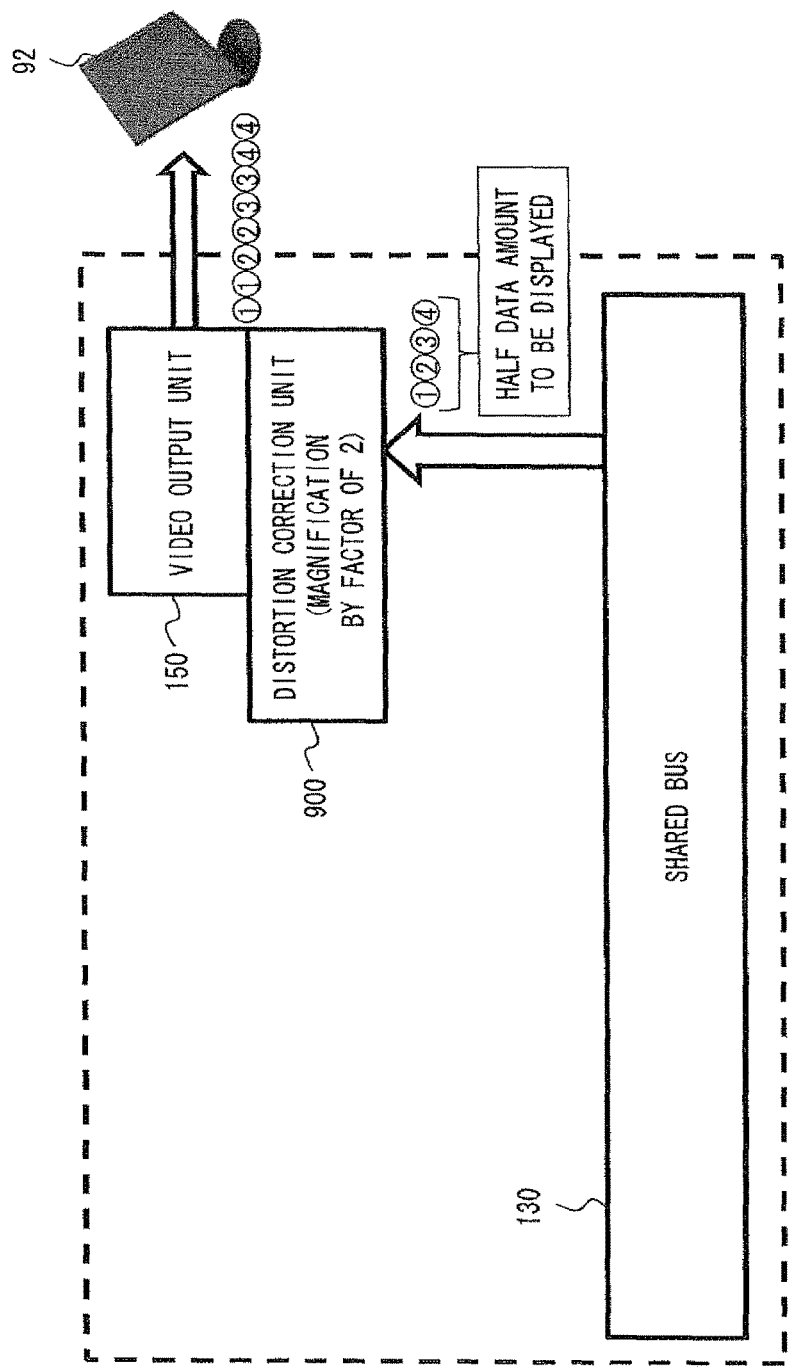
FIG. 12 is a block diagram for explaining a processing burden of magnification processing in an output unit.
Figure 13:
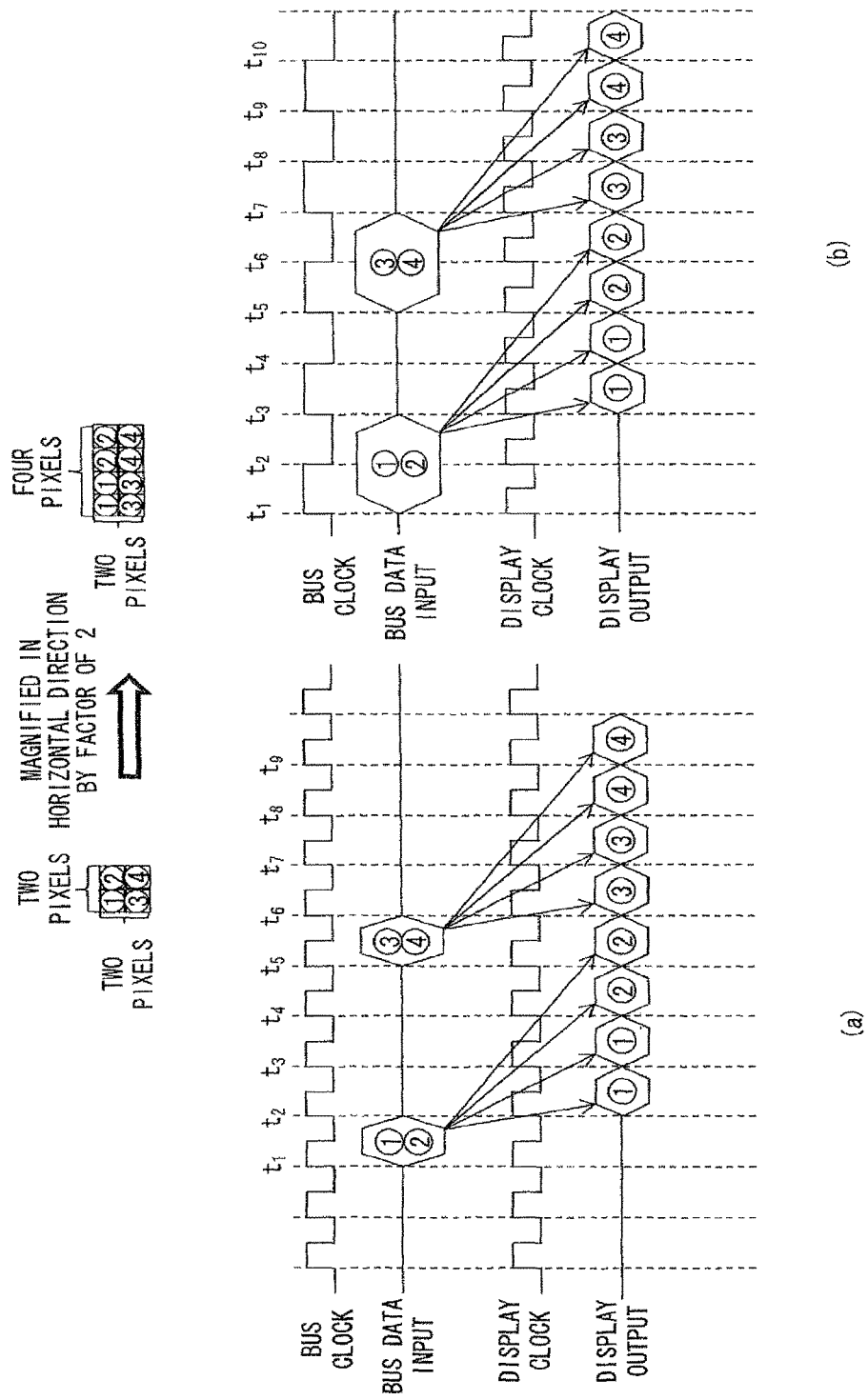
FIG. 13 is a timing chart for explaining a processing burden of magnification processing in an output unit.

Next, as shown in a block diagram shown in FIG. 12, a case where magnification processing is performed on image data immediately before the video output unit 150 and the processed image data is displayed on the monitor 92 is explained. In the case shown in FIG. 12, a process for magnifying image data (Pixels 1 to 4) read through the shared bus 130 to a data amount twice as large as the original data amount in the distortion correction unit 900 and for displaying the magnified image data is explained. FIG. 13 shows a timing chart for the case shown in FIG. 12. FIG. 13(*a*) is a timing chart for a case where the frequency of the bus clock (operation clock of shared bus 130) is equal to that of the display clock. FIG. 13(*b*) is a timing chart for a case where the frequency of the bus clock is half the frequency of the display clock.

In FIG. 13, the bus input data means data that is read through the shared bus 130. A plurality of pixels are read to the shared bus 130 at a time in synchronization with the bus clock. In the example shown in FIG. 13, data consisting of two pixels is read at a time. Specifically, at a time t1, Pixels 1 and 2 are read to the shared bus 130. Further, at a time t5, Pixels 3 and 4 are read.

The case where the frequency of the bus clock is equal to that of the display clock is explained with reference to FIG. 13(*a*). At a time t1, Pixels 1 and 2 are read to the shared bus 130. Then, the distortion correction unit 900 makes the monitor 92 display the pixels read through the shared bus 130 in synchronization with the display clock. Assume that the distortion correction unit 900 can display one pixel at each clock. The distortion correction unit 900 holds Pixels 1 and 2 read through the shared bus 130 in a memory (not shown) at the time t1, displays Pixel 1 at times t2 and t3, and displays Pixel 2 at times t4 and t5. Similarly, distortion correction unit 900 holds Pixels 3 and 4 read through the shared bus 130 at the time t5, displays Pixel 3 at times t6 and t7, and displays Pixel 4 at times t8 and t9. In this manner, the magnification processing of Pixels 1 to 4 are performed.

In contrast to this, the case where the frequency of the bus clock is half the frequency of the display clock is explained with reference to FIG. 13(*b*). The bus clock advances only one clock in a period in which the display clock advances two clocks. Therefore, the distortion correction unit 900 can perform processing corresponding to four clocks of the display clock (four pixels) in a period in which the bus clock advances two clocks. That is, the distortion correction unit 900 can display two Pixels 1 and two Pixels 2 in the period from when Pixels 1 and 2 are input to when Pixels 3 and 4 are input (time t3 to t6). Then, the distortion correction unit 900 can display two Pixels 3 and two Pixels 4 between a time t7 to t10. That is, even when the frequency of the bus clock is half the frequency of the display clock, the distortion correction unit 900 can perform the process in which Pixels 1 to 4 are magnified and the magnified pixels are displayed.

Figure 14:
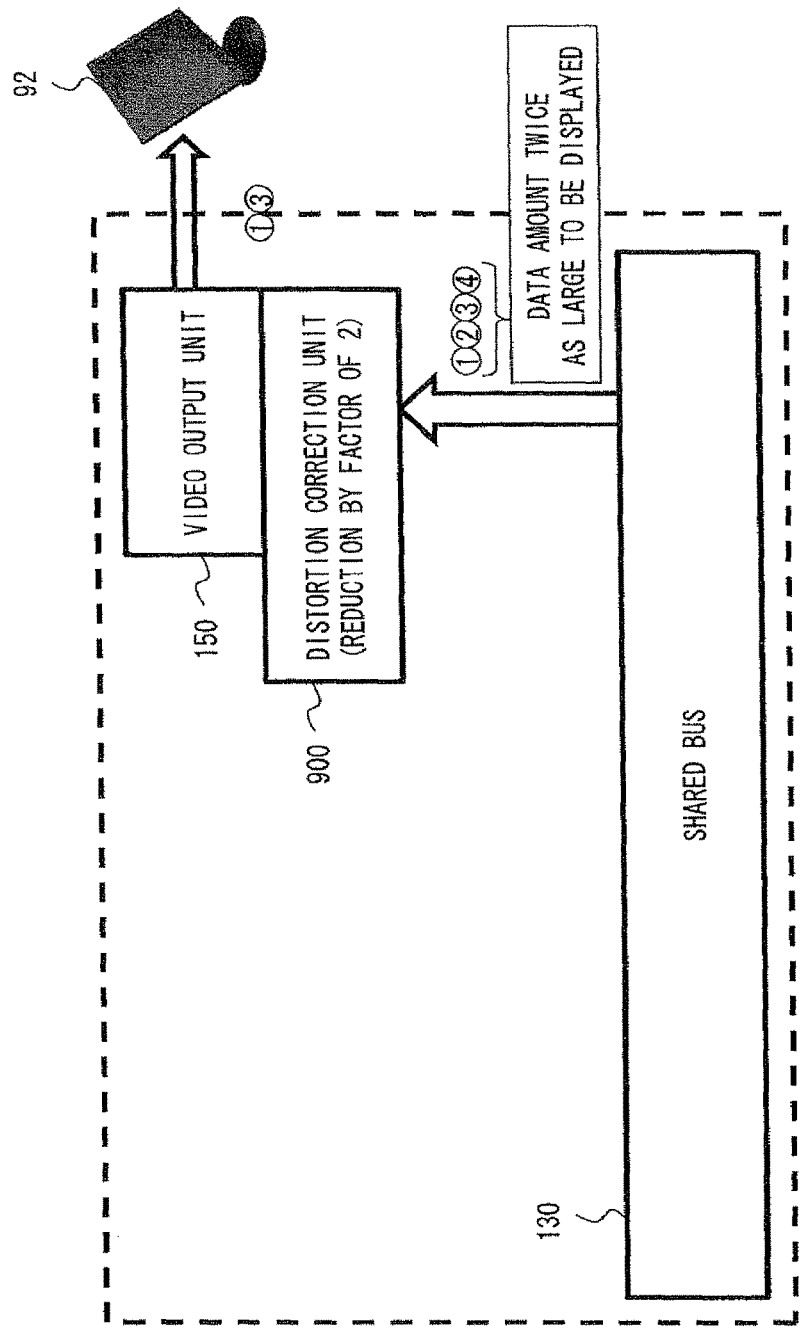
FIG. 14 is a block diagram for explaining a processing burden of magnification processing in an output unit.
Figure 15:
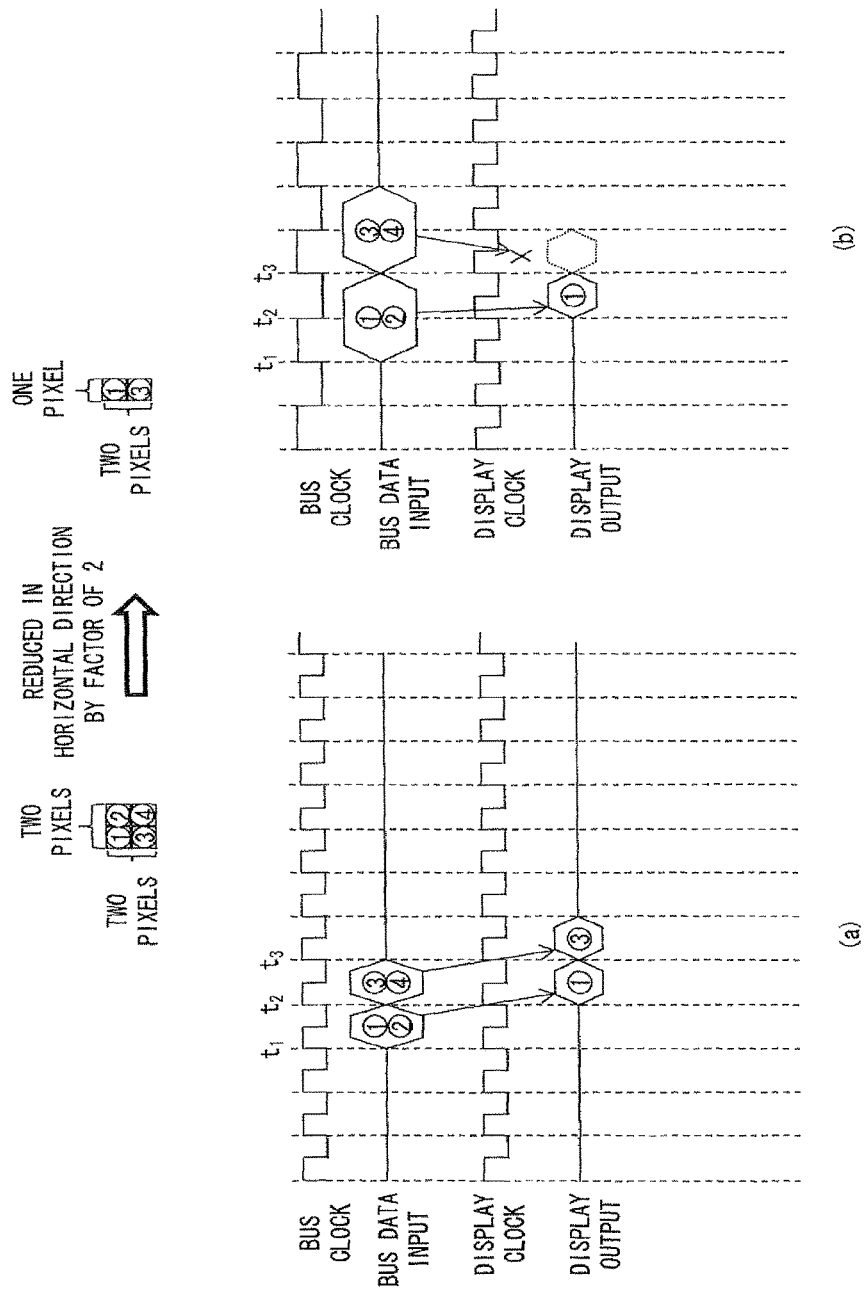
FIG. 15 is a timing chart for explaining a processing burden of magnification processing in an output unit.

Next, as shown in a block diagram shown in FIG. 14, a case where reduction processing is performed on image data immediately before the video output unit 150 and the processed image data is output to the monitor 92 is explained. In the case shown in FIG. 14, a process for reducing image data (Pixels 1 to 4) read through the shared bus 130 to a half data amount in the distortion correction unit 900 and for displaying the reduced image data is explained. FIG. 15 shows a timing chart for the case shown in FIG. 14.

FIG. 15(a) is a timing chart for a case where the frequency of the bus clock is equal to that of the display clock. FIG. 15(b) is a timing chart for a case where the frequency of the bus clock is half the frequency of the display clock.

The case where the frequency of the bus clock is equal to that of the display clock is explained with reference to FIG. 15(a). The distortion correction unit 900 makes the monitor 92 display the pixels read through the shared bus 130 in synchronization with the display clock. Assume that the distortion correction unit 900 can display one pixel at each clock. The distortion correction unit 900 makes the monitor 92 display, among Pixels 1 and 2 read at a time t1, Pixel 1 at a time t2. Further, the distortion correction unit 900 makes the monitor 92 display, among Pixels 3 and 4 read at the time t2, Pixel 3 at a time t3. In this manner, the process for reducing Pixels 1 to 4 to Pixels 1 and 3 is performed.

In contrast to this, the case where the frequency of the bus clock is half the frequency of the display clock is explained with reference to FIG. 15(b). In this case, the distortion correction unit 900 can also display, among Pixels 1 and 2 read at a time t1 by the shared bus 130, Pixel 1 at a time t2. However, the distortion correction unit 900 cannot display Pixels 3 and 4, which are read at a time t3 by the shared bus 130, at the same time t3.

As describe above, in the case where reduction processing is performed on image data immediately before the video output unit 150 and the processed image data is output to the monitor 92, in order to implement the reduction processing, the input data rate at which data is obtained from the shared bus 130 needs to be higher than the output data rate required for the display. Therefore, the shared bus 130 needs to have a wide bus band.

As described above, when image data is magnified by a factor n before being output to the shared bus 130, the distortion correction unit 900 needs to generate n pixels for each pixel taken in from the camera 91 and output the generated pixels to the shared bus 130. Therefore, high processing performance and high memory band are required in order to cope with a high magnification ratio. Therefore, in order to cope with a high magnification ratio, it is necessary to increase the logic of the semiconductor device 1 and widen the band of the shared bus 130, and thus leading to an increase in the product cost. In contrast to this, when image data is reduced by a factor n before being output to the shared bus 130, the distortion correction unit 900 needs only to generate one pixel for every n pixels taken in from the camera 91. Therefore, the necessary processing performance is small and the bus band required for the shared bus 130 is also narrow.

Further, when image data output from the shared bus 130 is magnified by a factor n before being displayed, the distortion correction unit 900 can output (display) n pixels for each pixel obtained through the shared bus 130. In contrast to this, when image data output from the shared bus 130 is reduced by a factor n before being displayed, the distortion correction unit 900 can output (display) only one pixel for every n pixels obtained through the shared bus 130. Therefore, in the case where image data output from the shared bus 130 is magnified or reduced before being displayed, the reduction processing requires a wider bus band than the magnification processing.

In the semiconductor device 9 according to the comparative example shown in FIG. 1, the distortion correction processing of image data including the magnification processing is performed in the distortion correction unit 900 before the image data is output to the shared bus 130 (see FIG. 5). Therefore, the data amount of the image data increases before the image data is transmitted through the shared bus 130. Accordingly, it is necessary to secure a wide bus band for the shared bus 130. Further, the frequency of the distortion correction clock of the distortion correction unit 900 needs to be at least twice as high as that of the video input clock. Therefore, the distortion correction unit 900 needs to have high performance. As a result, there is a problem that the product cost increases. According to a semiconductor device in accordance with an embodiment of the present invention explained below, it is possible to solve the problem like this that occurs in the semiconductor device 9.

<First Embodiment>

Figure 16:
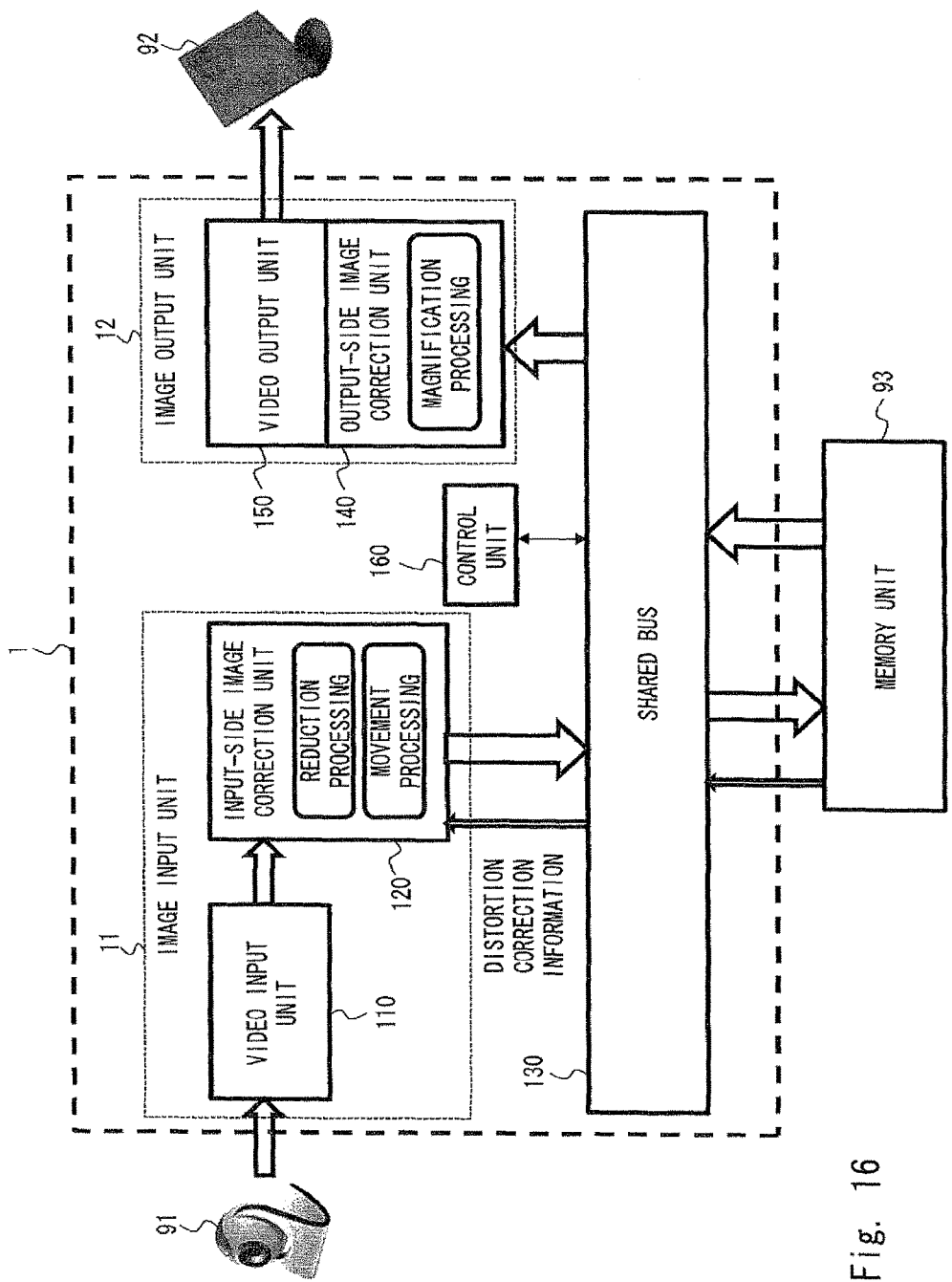
FIG. 16 is a block diagram of a semiconductor device according to a first embodiment.

An outline of an embodiment according to the present invention is explained hereinafter with reference to the drawings. Firstly, a semiconductor device 1 according to this embodiment of the present invention is explained with reference to FIG. 16. FIG. 16 is a block diagram of a semiconductor device 1 according to this embodiment (corresponding to block diagram of semiconductor device 9 shown in FIG. 5). The configuration of the semiconductor device 1 shown in FIG. 16 is different from the configuration of the semiconductor device 9 shown in FIG. 1 in that an input-side image correction unit 120 is provided in place of the distortion correction unit 900 and that an output-side image correction unit 140 is added between the shared bus 130 and the video output unit 150.

<Outline of Configuration of Semiconductor Device 1>

The semiconductor device 1 includes an image input unit 11, an image output unit 12, a shared bus 130, and a control unit 160. The semiconductor device 1 corrects a distortion(s) on image data taken in from an external camera(s) 91 and displays the corrected image on an external monitor 92.

The image input unit 11 obtains image data (first image data) generated by an image-taking process by the camera 91. Further, the image input unit 11 stores image data (second image data) that has been corrected in the input-side image correction unit 120 into the memory unit 93 through the shared bus 130. The image input unit 11 includes a video input unit 110 and the input-side image correction unit 120.

The image output unit 12 reads image data stored in the memory unit 93 through the shared bus 130. Then, the image output unit 12 displays, based on image data (third image data) that has been corrected in the input-side image correction unit 120 and the output-side image correction unit 140, a distortion-corrected image on the monitor 92. The image output unit 12 includes the output-side image correction unit 140 and a video output unit 150.

The shared bus 130 (data bus) is a bus for connecting the image input unit 11, the image output unit 12, and the memory unit 93 with each other.

Each of the input-side image correction unit 120 and the output-side image correction unit 140 corrects a distortion(s) on image data obtained by the image input unit 11 by using an affine-conversion. The input-side image correction unit 120 is disposed in the image input unit 11. The input-side image correction unit 120 performs at least reduction processing among the correction processes included in the affine-conversion in the image input unit 11. As shown in FIG. 16, the input-side image correction unit 120 also performs movement processing (translation processing, rotation processing, and sheering processing) in addition to the reduction processing in this embodiment.

Meanwhile, the output-side image correction unit 140 is disposed in the image output unit 12. As shown in FIG. 16, the output-side image correction unit 140 performs at least magnification processing among the image conversion processes included in the affine-conversion in the image output unit 12.

Figure 17:
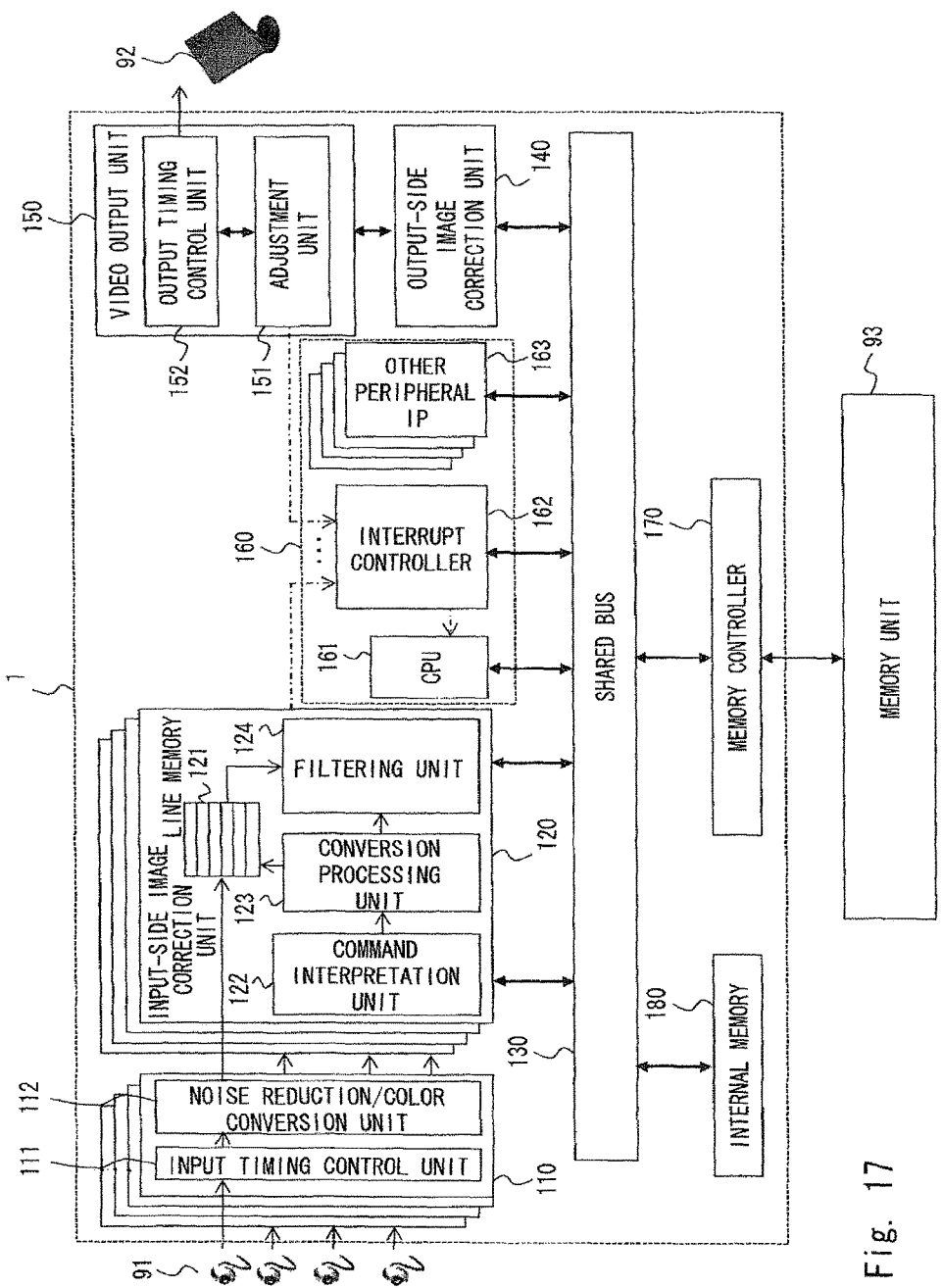
FIG. 17 is a detailed block diagram of a semiconductor device according to a first embodiment.

FIG. 17 is a detailed block diagram of the block diagram shown in FIG. 16 (corresponding to block diagram of semiconductor device 9 shown in FIG. 1). Note that the configuration other than the input-side image correction unit 120 and the output-side image correction unit 140 is similar to that of the semiconductor device 9 shown in FIG. 1, and therefore its explanation is omitted as appropriate.

<Configuration of Input-side Image Correction Unit 120>

The input-side image correction unit 120 performs at least reduction processing among the correction processes included in the affine-conversion for uncorrected image data (first image data) input from the video input unit 110. In this embodiment, the input-side image correction unit 120 also performs movement processing (rotation processing, translation processing, and sheering processing) in addition to the reduction processing for the input image data. However, the input-side image correction unit 120 does not perform the magnification processing.

That is, the input-side image correction unit 120 generates a combined transformation matrix for performing reduction processing, translation processing, rotation processing, and sheering processing in advance. Then, the input-side image correction unit 120 performs an affine-conversion (first affine-conversion) by using the combined transformation matrix. In other words, in the input-side image correction unit 120, the correction processes included in the affine-conversion except for the magnification processing are performed by one matrix operation. Note that the first affine-conversion in the input-side image correction unit 120 includes reduction processing, translation processing, rotation processing, and sheering processing, but does not include magnification processing.

The input-side image correction unit 120 generates image data (second image data) on which correction processing has been performed, by performing reduction processing and movement processing for the image data (first image data) obtained from the camera 91. The input-side image correction unit 120 stores the generated image data into the memory unit 93 disposed outside the semiconductor device 1 through the shared bus 130. In general, the operation clock(s) of the camera(s) 91 is not in synchronization with the operation clock of the monitor 92. Therefore, the output timing of image data is adjusted by temporarily storing the image data in the memory unit 93.

The input-side image correction unit 120 includes a line memory 121, a command interpretation unit 122, a conversion processing unit 123, and a filtering unit 124. Note that these units except for the conversion processing unit 123 operate in a similar manner to those in the distortion correction unit 900 of the semiconductor device 9, and therefore their explanation is omitted.

The conversion processing unit 123 performs correction processing for image data stored in the line memory 121 in response to an instruction from the command interpretation unit 122. In this embodiment, the conversion processing unit 123 performs reduction processing, translation processing, rotation processing, and sheering processing for image data stored in the line memory 121. More specifically, the conversion processing unit 123 designates an address of the image data stored in the line memory 121 on a pixel-by-pixel basis based on distortion correction information and thereby moves pixels (translation processing, rotation processing, and/or sheering processing) and/or deletes pixels (reduction processing). That is, the conversion processing unit 123 does not perform the magnification processing for the image data.

<Configuration of Output-side Image Correction Unit 140>

The output-side image correction unit 140 reads the image data (second image data), which has undergone the correction processing performed by the input-side image correction unit 120 and has been stored in the memory unit 93, through the shared bus 130. Then, the output-side image correction unit 140 performs magnification processing (second affine-conversion) among the correction processes included in the affine-conversion for the read data and thereby generates distortion-corrected image data (third image data). However, the output-side image correction unit 140 does not perform the reduction processing. In other word, the second affine-conversion in the output-side image correction unit 140 includes magnification processing, but does not include reduction processing.

That is, the semiconductor device 1 performs distortion correction processing using an affine-conversion for image data input to the video input unit 110 by the correction processing performed by the input-side image correction unit 120 and the correction processing performed by the output-side image correction unit 140. In other words, the distortion-corrected image data (third image data) is generated by performing an affine-conversion(s) on uncorrected image data (first image data) input from the camera 91. The output-side image correction unit 140 generates distortion-corrected image data (third image data) by performing magnification processing for the image data (second image data) stored in the memory unit 93. The output-side image correction unit 140 outputs the generated image data to the video output unit 150.

<Operation Example of Semiconductor Device 1>

Figure 18:
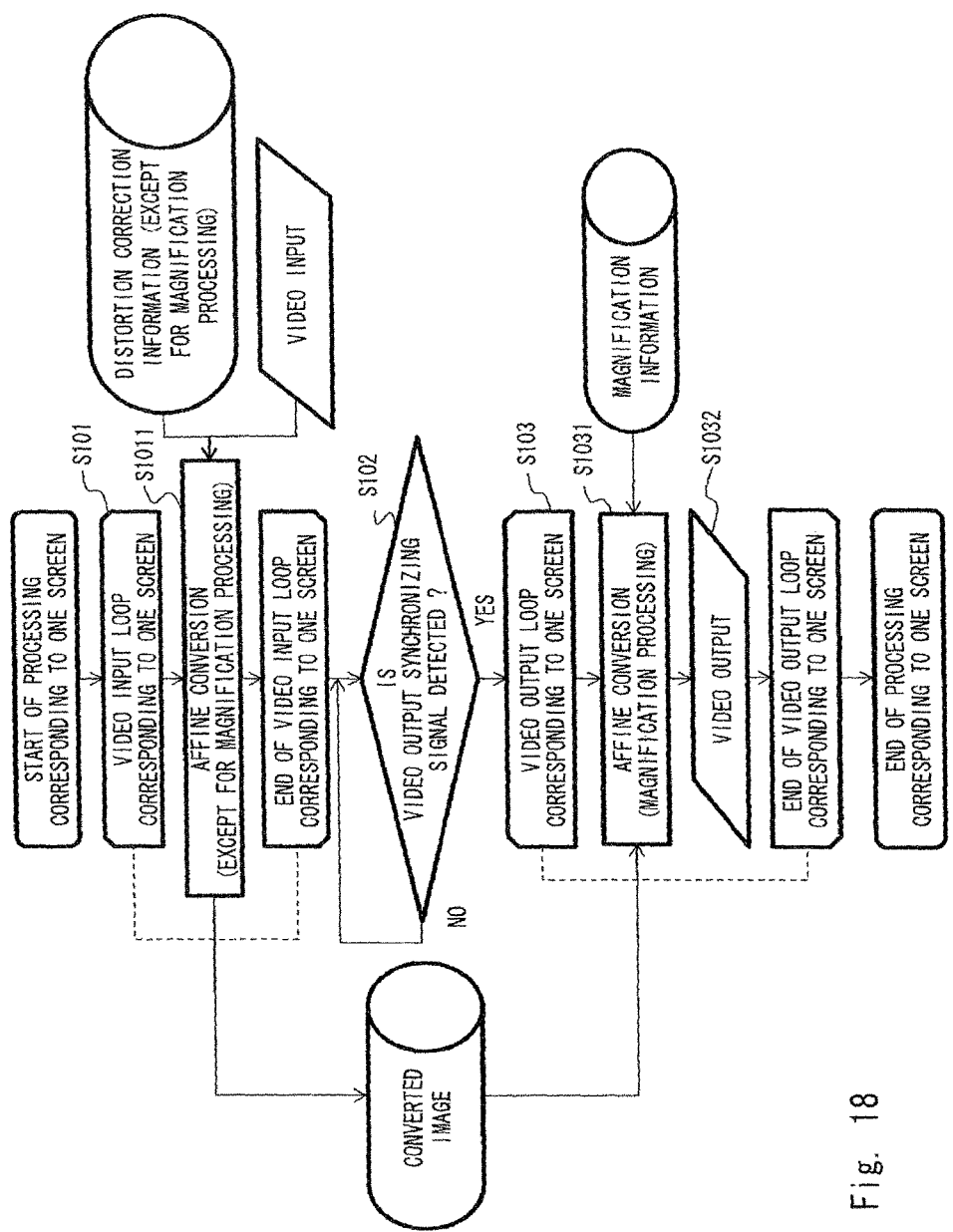
FIG. 18 is a flowchart showing an operation example of a semiconductor device according to a first embodiment.

Next, an operation example of the semiconductor device 1 according to this embodiment of the present invention is explained with reference to a flowchart shown in FIG. 18. Note that FIG. 18 shows processing that is performed for image data corresponding to one screen (one frame) input from the camera(s) 91. Therefore, in order to display moving images on the monitor 92 by using image data corresponding to a plurality of frames, the flow shown in FIG. 18 needs to be repeated.

Figure 19:
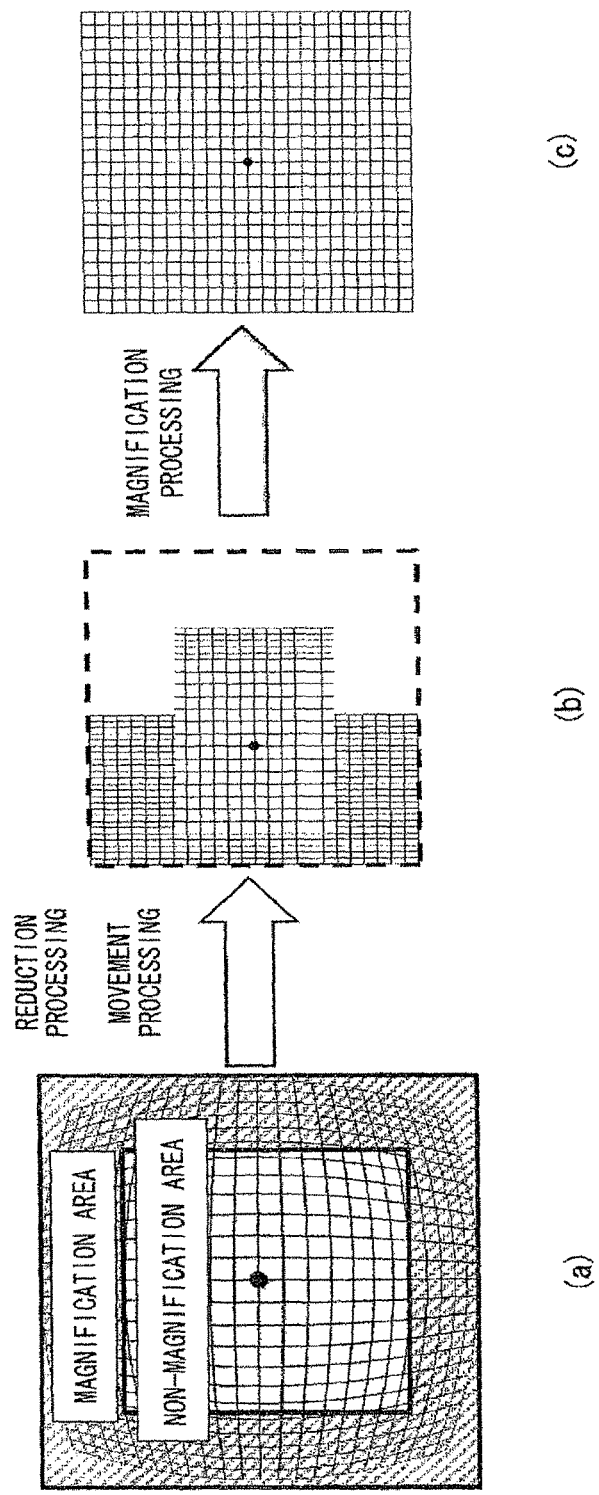
FIG. 19 is a drawing for explaining a process of distortion correction processing according to a first embodiment.

Note that the following explanation is made on the assumption that the subject is an object in which square shapes are arranged in a lattice pattern as in the case of the subject shown in FIG. 7. FIG. 19 shows image data that changes through the process of distortion correction processing. FIG. 19(*a*) shows image data (first image data) on which distortion correction has not yet been made. FIG. 19(*b*) shows image data (second image data) on which correction processing other than magnification processing in the horizontal direction has been already performed by the input-side image correction unit 120. FIG. 19(*c*) shows image data on which magnification processing in the horizontal direction has been already performed by the output-side image correction unit 140, i.e., image data (third image data) for which distortion correction processing has been completed.

Further, assume that the lens of the camera 91 is a fish-eye lens. Therefore, as explained above with reference to FIG. 7, image data taken by the camera(s) 91 (image data before distortion correction) is distorted image data as shown in FIG. 19(*a*). Further, a magnification area (first area) and a non-magnification area (second area) are unevenly located. Specifically, the hatched area in FIG. 19(*a*) is a magnification area and the other area is a non-magnification area. The rectangular non-magnification area is surrounded by the magnification area.

Figure 20:
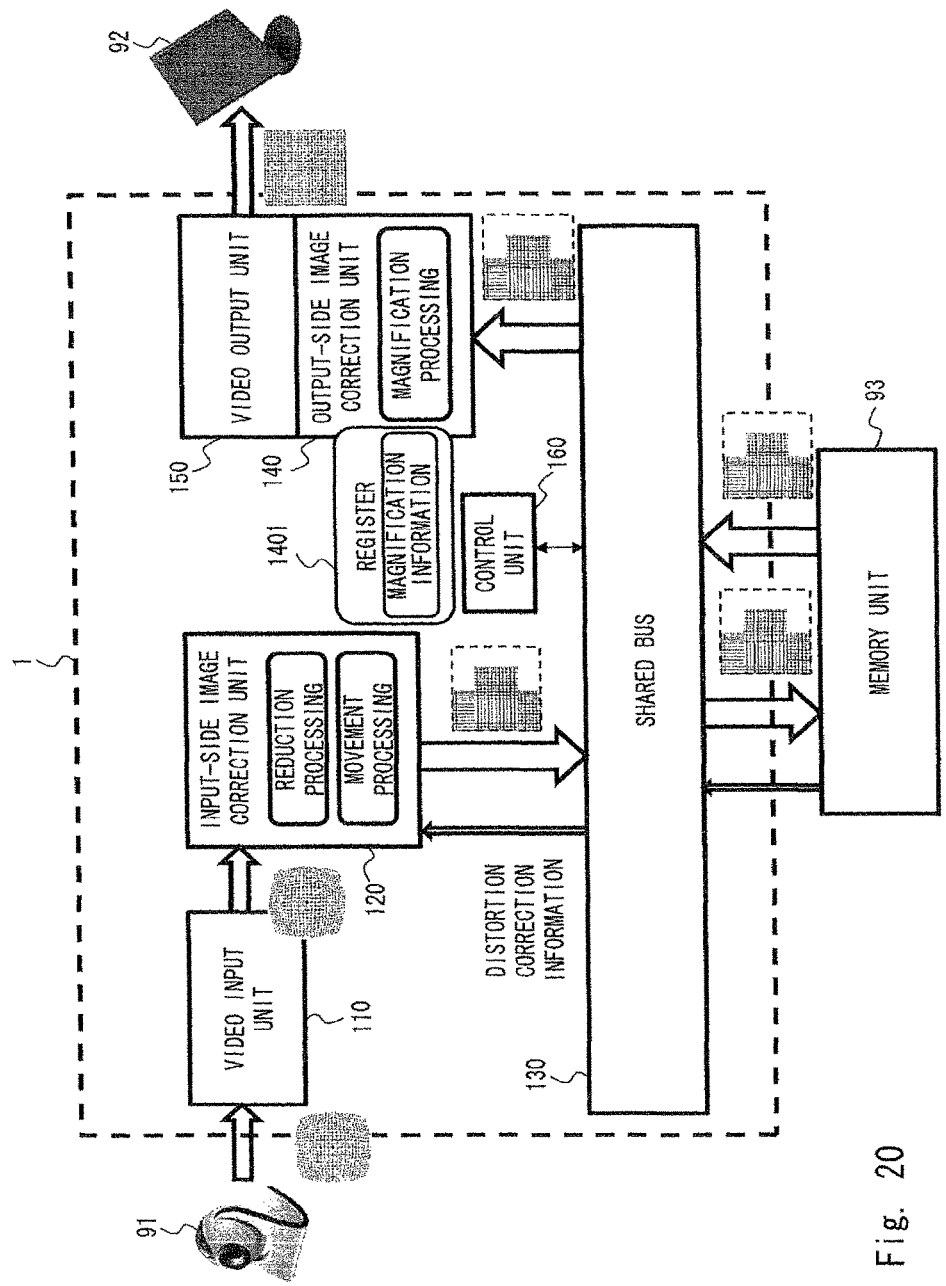
FIG. 20 shows states of image data in a block diagram of a semiconductor device according to a first embodiment.

Details of distortion correction processing are explained hereinafter. FIG. 20 shows a block diagram that is obtained by adding states of image data output from respective blocks in the block diagram shown in FIG. 16. The following explanation is made by also referring to the block diagram shown in FIG. 20.

<Operation of Image Input Unit 11>

Firstly, image data generated by an image-taking process by the camera (s) 91 is input to the video input unit 110. At this point, the image data is distorted image data as shown in FIG. 19(a) (see FIG. 20).

The video input unit 110 performs noise reduction processing, color conversion processing, and the like for the input image data and outputs the processed image data to the input-side image correction unit 120. No distortion correction processing is performed in the video input unit 110. Therefore, as shown in FIG. 20, the image data input to the input-side image correction unit 120 is still distorted image data (first image data).

Next, the input-side image correction unit 120 performs a video input loop for the image data corresponding to one screen input from the video input unit 110 (step S101). In the video input loop in the step S101, the input-side image correction unit 120 performs the processing other than the magnification processing (first affine-conversion) among the correction processes of the affine-conversion for the input image data (step S1011).

Specifically, the input-side image correction unit 120 performs reduction processing, rotation processing, translation processing, and sheering processing for a plurality of pixels included in the input image data at a time based on distortion correction information that is stored in the memory unit 93 in advance. Note that in the input-side image correction unit 120, all of the reduction processing, rotation processing, translation processing, and sheering processing do not necessarily have to be performed. In the input-side image correction unit 120, the reduction processing and at least another correction processing (at least one of rotation processing, translation processing, and sheering processing) need to be performed. Which correction processing should be performed is determined as appropriate according to the distortion state of the image data.

More specifically, the command interpretation unit 122 reads distortion correction information stored in the memory unit 93 and outputs the read distortion correction information to the conversion processing unit 123. Assume that this distortion correction information is information that is defined by a user in advance, and is information for specifying places having a high magnification ratio and for lowering the magnification ratio of the specified places.

In consideration of the fact that in general, a display module reads data on a line-by-line basis, it is desirable to lower the magnification ratio (reduce) in the x-direction. In this example, for example, the magnification ratio is 1/2 in the x-direction. By using a uniform scaling factor as the magnification ratio of the magnification area in this manner, the magnification ratio of the entire area that should be magnified becomes a uniform scaling factor in the magnification processing (which is described later). As a result, the number of parameters used in the magnification processing can be reduced.

Note that it is conceivable to use a method in which in the input-side image correction unit 120, the entire image data (magnification area and non-magnification area) is reduced by a uniform scaling factor and in the output-side image correction unit 140, the entire image is magnified by a uniform scaling factor. However, if the non-magnification (area having enough magnitude for the display even when no processing has been performed for the image data input from the camera 91), which does not need to be magnified, is also reduced, pixels in the non-magnification are also reduced. As a result, the image quality of the image(s) displayed on the monitor 92 deteriorates. In contrast to this, in this embodiment, the input-side image correction unit 120 reduces only the magnification area, which is a part of the area included in the image data, by a uniform scaling factor. Therefore, it is possible to reduce the area in which pixels are reduced and thereby to prevent the deterioration of the image quality.

The conversion processing unit 123 designates an address(es) of a pixel (s) stored in the line memory 121 and performs the movement of the pixel (s) and/or the deletion of the pixel (s) based on mapping information. In this way, the correction processing including reduction processing, rotation processing, translation processing, and/or sheering processing is performed for the image data input from the video input unit 110.

Note that the reduction processing for image data performed in the input-side image correction unit 120 is a process for reducing pixels. Therefore, the image data on which the correction processing has been performed by the conversion processing unit 123 is image data containing a smaller number of pixels (see FIG. 19(b)) than that of the image data input from the camera 91 (see FIG. 19(a)). As a result, the amount of the image data that is output from the input-side image correction unit 120 to the memory unit 93 is reduced. As a result, it is possible to reduce the bus band of the shared bus 130 through which the image data on which the reduction processing has been performed is transmitted. Note that in the image data shown in FIG. 19(a), mapping information for the non-magnification area is generated in such a manner that the scaling factor for each square shape becomes uniform. Then, the reduction processing is performed as appropriate by the conversion processing unit 123.

The input-side image correction unit 120 repeats the above-described conversion processing for each pixel (performs loop processing). After that, the filtering unit 124 performs a shading process and/or a linear interpolation process on a plurality of pixels, at a time, included in the image data on which the correction processing has been performed by the conversion processing unit 123. Then, the filtering unit 124 stores the correction-processed image data into the memory unit 93 through the shared bus 130 in such a manner that a plurality of pixels are stored at a time. As a result, image data (second image data) that is obtained by performing the correction processing including reduction processing, rotation processing, translation processing, and sheering processing for image data corresponding to one screen stored in the line memory 121 is stored into the memory unit 93 (see FIG. 20).

<Operation of Image Output Unit 12>

Next, operations of the output-side image correction unit 140 and the video output unit 150 are explained. The output-side image correction unit 140 and the video output unit 150 detect whether or not a synchronizing signal for video output has been input (step S102). When the output-side image correction unit 140 and the video output unit 150 detect that a synchronizing signal for video output has been input (step S102: Yes), they perform a video output loop corresponding to one screen (step S103). In the video output loop in the step S102, the output-side image correction unit 140 performs magnification processing (second affine-conversion) among the correction processes included in the affine-conversion for the image data (second image data) stored in the memory unit 93 (step S1031).

Specifically, the output-side image correction unit 140 obtains image data from the memory unit 93 through the shared bus 130 in such a manner that a plurality of pixels are obtained at a time. At this point, the image data obtained by the output-side image correction unit 140 is image data (second image data) on which correction processing other than magnification processing has been already performed by the input-side image correction unit 120. That is, the image data obtained by the output-side image correction unit 140 through the shared bus 130 is image data on which reduction processing has been already performed (see FIG. 20). Therefore, the image data obtained by the output-side image correction unit 140 is image data containing a smaller number of pixels than that of the image data input from the camera 91. As a result, the amount of the image data that is output from the memory unit 93 to the output-side image correction unit 140 is reduced, and thereby making it possible to reduce the bus band.

Then, the output-side image correction unit 140 performs magnification processing on the obtained pixels based on magnification information that is stored in a register 1401 disposed in the output-side image correction unit 140 in advance. Then, the output-side image correction unit 140 outputs the pixels, on which the magnification processing has been already performed, to the video output unit 150. That is, image data (third image data), whose distortion has been corrected by the input-side image correction unit 120 and the output-side image correction unit 140, is output to the video output unit 150. By storing the magnification information in the register 1401 in advance, it is possible to omit the process for reading the magnification information from other memories (e.g., memory unit 93) through the shared bus 130. Note that the magnification information is information indicating pixels on which magnification processing should be performed among the image data stored in the memory unit 93. For example, the magnification information is information including address information, magnification ratios, and the like of pixels to be magnified.

The video output unit 150 performs a color adjustment for pixels input from the output-side image correction unit 140 and displays the adjusted pixels on the monitor 92 (step S1032). The output-side image correction unit 140 and the video output unit 150 repeat the above-described magnification processing and the display processing for each pixel (performs loop processing). As a result, distortion-corrected image data corresponding to one screen is displayed on the monitor 92 (see FIG. 19(c)). Through the above-described processes, the distortion correction processing corresponding to one screen has been finished.

As described above, according to the configuration of the semiconductor device 1 in accordance with this embodiment of the present invention, the input-side image correction unit 120 performs the affine-conversion other than the magnification processing (i.e., reduction processing, translation processing, rotation processing, and sheering processing) for image data (first image data) input from the camera(s) 91. That is, no magnification processing is performed in the input-side image correction unit 120. Then, the input-side image correction unit 120 stores the corrected image data (second image data) into the memory unit 93 through the shared bus 130. Further, the output-side image correction unit 140 reads the image data corrected by the input-side image correction unit 120 from the memory unit 93 through the shared bus 130. The output-side image correction unit 140 performs magnification processing for the read image data (second image data) and outputs the distortion-corrected image data (third image data) to the video output unit 150. Then, the video output unit 150 makes the monitor 92 display the distortion-corrected image. Therefore, no magnification processing has been performed on the image data that is transmitted through the shared bus 130. That is, the image data that is transmitted through the shared bus 130 is data on which reduction processing has been already performed by the input-side image correction unit 120. That is, the image data that is transmitted through the shared bus 130 has a smaller data amount than that of the image data on which magnification processing has been performed. In other words, the image data is transmitted through the shared bus 130 after undergoing reduction processing. Therefore, there is no need to secure a wide bus band for the shared bus 130, and thereby making it possible to reduce the bus band in comparison to the configuration of the semiconductor device 9 shown in FIG. 2. As a result, designing the bus becomes easier, and thus making it possible to reduce the logic of the semiconductor device 1.

Further, the output-side image correction unit 140 performs only the magnification processing included in the affine-conversion. In other words, one matrix operation, i.e., matrix operation for magnification processing is performed in the output-side image correction unit 140. That is, in the semiconductor device 1 according to this embodiment, although distortion correction is performed by using an affine-conversion, the matrix operation for performing reduction processing, translation processing, rotation processing, and sheering processing is calculated separately from the matrix operation for performing magnification processing. Therefore, two matrix operations are performed for distorted image data corresponding one screen. That is, one matrix operation (first affine-conversion) is performed in the input-side image correction unit 120 and another matrix operation (second affine-conversion) is performed in the output-side image correction unit 140. As described above, in the configuration of the semiconductor device 1 according to this embodiment, among the correction processes included in the affine-conversion, the matrix operation for reduction processing and the matrix operation for magnification processing are separately calculated on purpose. In this manner, it is possible to reduce image data before the image data is transmitted through the shared bus 130, and to magnify the image data after the image data is transmitted through the shared bus 130. As a result, it is possible to reduce the bus band of the shared bus 130.

Further, in the semiconductor device 1 according to this embodiment, the input-side image correction unit 120 performs reduction processing on image data immediately after the video input unit 110 (immediately before the shared bus 130). Therefore, as explained above with reference to FIGS. 10 and 11, it is possible to use a lower frequency for the distortion correction clock of the input-side image correction unit 120 than that for the video input clock.

In addition, the output-side image correction unit 140 performs magnification processing on image data immediately before the video output unit 150 (immediately after shared bus 130). Therefore, it is possible to lower the input data rate required for the shared bus 130 in comparison to the case where no magnification processing is performed. As a result, it is possible to reduce the processing burden on the input-side image correction unit 120 and the shared bus 130.

In contrast to this, in the processing performed in the semiconductor device 9, the image data on which all the processes except for the magnification processing have been performed is not generated as obvious from FIG. 5 (see FIG. 19(b)). Therefore, the image data on which magnification processing has been performed is stored into the memory unit 93 through the shared bus 130. Then, the image data, which has undergone the magnification processing and has been stored in the memory unit 93, is output to the video output unit 150 through the shared bus 130. That is, the image data, which has undergone the magnification processing and thus has a large data amount, has to be transmitted through the shared bus 130. Therefore, a wide bus band has to be secured for the shared bus 130.

<Modified Example 1>

Figure 21:
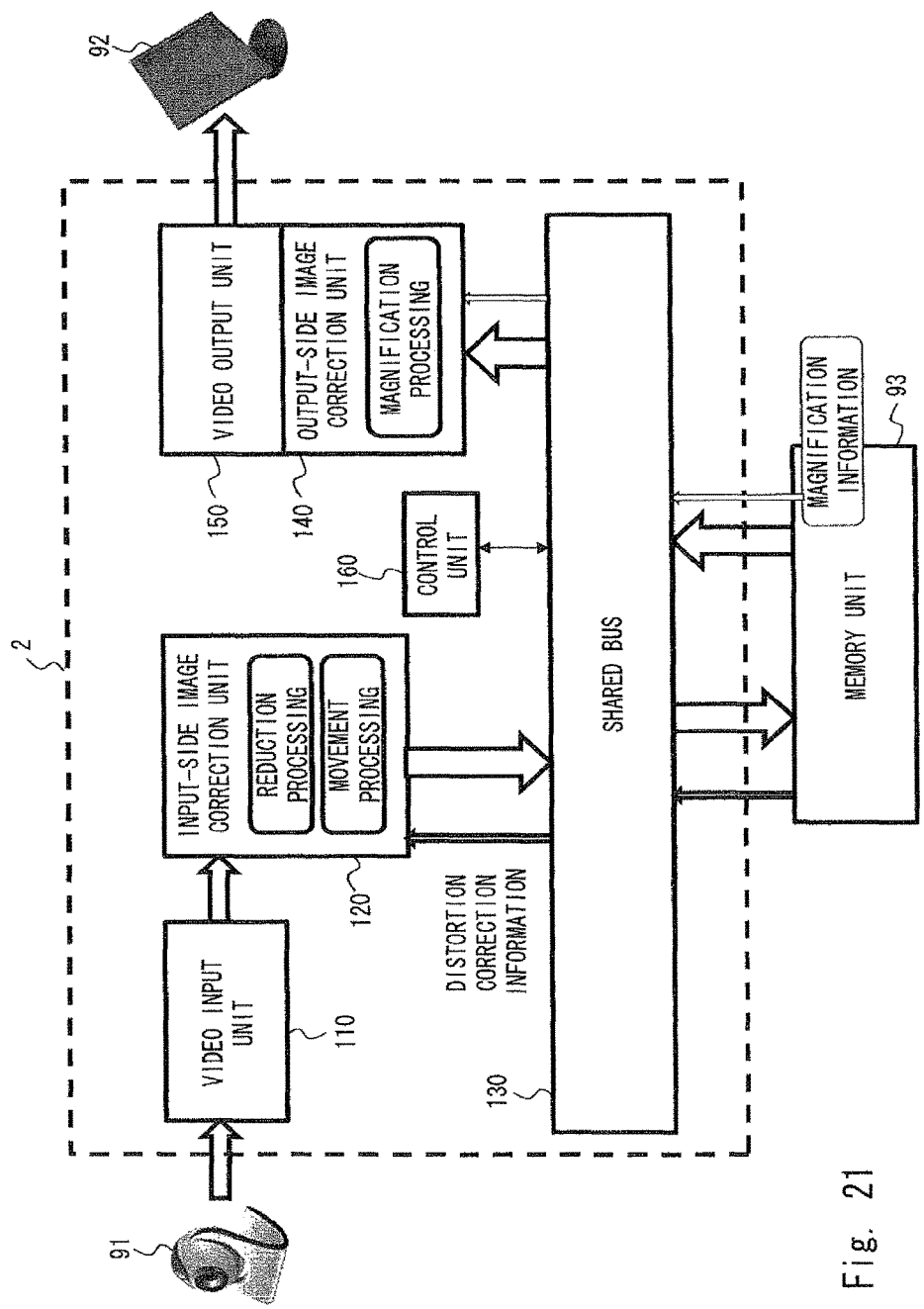
FIG. 21 is a block diagram of a semiconductor device according to Modified example 1 of a first embodiment.

Modified example 1 of the semiconductor device 1 according to this embodiment of the present invention is explained. FIG. 21 shows a configuration of a semiconductor device 2 according to Modified example 1 of this embodiment. The semiconductor device 2 shown in FIG. 21 is different from the semiconductor device 1 shown in FIG. 16 in that the magnification information that the output-side image correction unit 140 refers to is stored in the external memory unit 93. Note that the other configuration is similar to that of the semiconductor device 1, and therefore its explanation is omitted as appropriate.

When the output-side image correction unit 140 reads image data (second image data) stored in the memory unit 93, the output-side image correction unit 140 reads magnification information together with the image data. Then, the output-side image correction unit 140 performs magnification processing for the image data read from the memory unit 93 based on the magnification information read from the memory unit 93.

As described above, according to the configuration of the semiconductor device 2 in accordance with Modified example 1, the magnification information is stored in the memory unit 93 in advance. In this way, there is no need to store the magnification information in the output-side image correction unit 140 of the semiconductor device 2. As a result, it is possible to reduce the memory cost of the semiconductor device 2.

<Modified Example 2>

Modified example 2 according to this embodiment of the present invention is explained. In the above-described first embodiment, the mapping information, which is generated by the conversion processing unit 123, can specify a magnification area(s) and a non-magnification area(s) in a detailed fashion. However, because of this feature, the mapping information is complicated.

Figure 22:
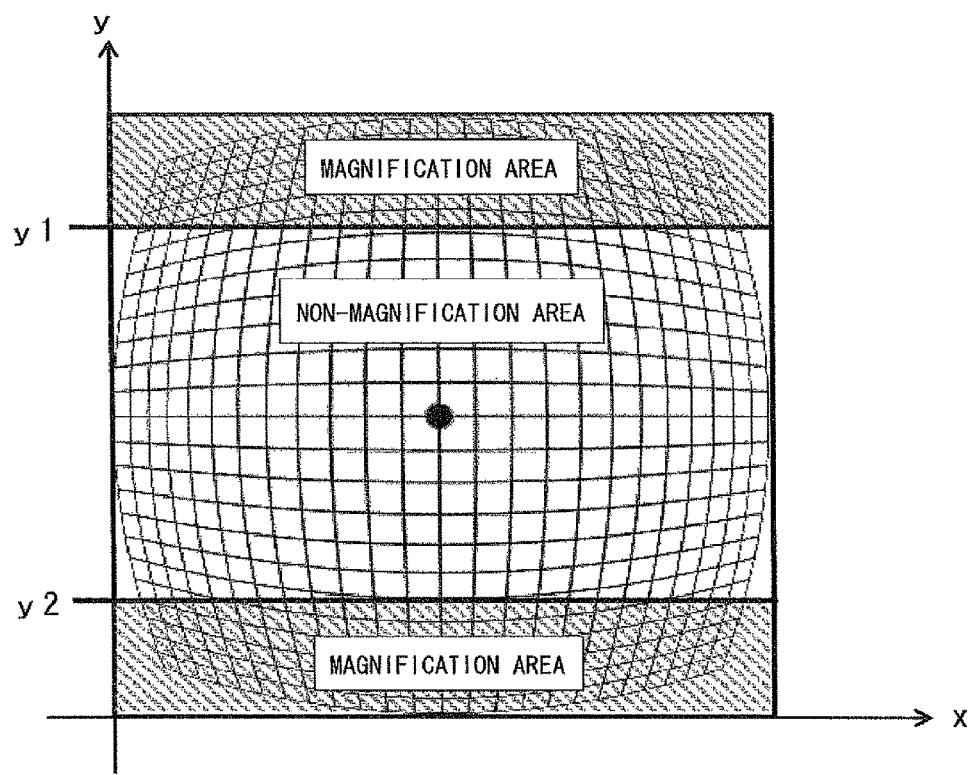
FIG. 22 is a drawing for explaining an enlarged area and a non-enlarged area according to Modified example 2 of a first embodiment.

In Modified example 2, the image data is divided into three sections along the Y-axis direction. Further, each section is specified as a magnification area or a non-magnification area. Specifically, as shown in FIG. 22, an area in the image data whose coordinate on the y-axis is equal to or greater than y1 is specified as a magnification area (first area). Further, an area whose coordinate on the y-axis is equal to or greater than y2 and less that y1 is specified as a non-magnification area (second area). Furthermore, an area whose coordinate on the y-axis is less that y2 is specified as a magnification area (first area). That is, the magnification area and the non-magnification area in the image data on which the correction has not yet been made (first image data) and the image data on which the magnification processing has not yet been made (second image data) are determined based solely on the y-axis coordinate.

As described above, according to the configuration of the semiconductor device in accordance with Modified example 2, the magnification area and the non-magnification area can be determined based solely on the y-axis coordinate. By defining areas in this manner, defining areas becomes easier. Specifically, in the above-described first embodiment, it is necessary to define the magnification area as a rectangular area. However, in Modified example 2, the magnification area can be defined by determining only two points on the y-axis. Therefore, it is possible to reduce the necessary setting parameters and thereby to make the mapping analysis in the conversion processing unit 123 easier.

Further, it is possible to determine whether it is a magnification area or nor with ease. Specifically, the conversion processing unit 123 can determine whether or not the currently-processed area (pixel) should be magnified based on distortion correction information just by comparing the currently-processed y-coordinate with the y-coordinates of predefined two points. Needless to say, the magnification area and the non-magnification area can be determined based solely on two points on the x-axis instead of two points on the y-axis.

<Modified Example 3>

Figure 23:
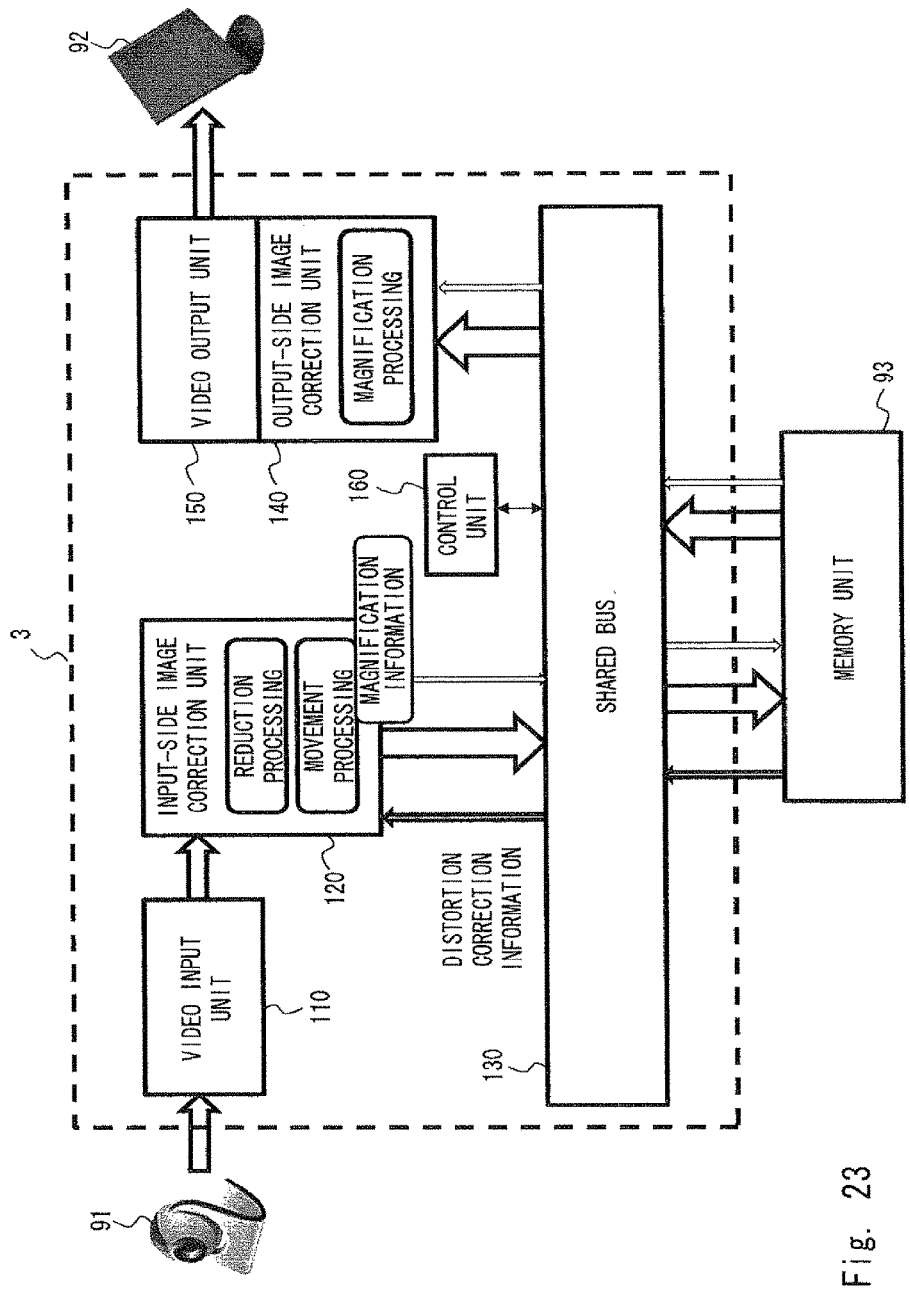
FIG. 23 is a block diagram of a semiconductor device according to Modified example 3 of a first embodiment.

Modified example 3 is explained hereinafter with reference to the drawings. FIG. 23 shows a block diagram of a semiconductor device 3 according to Modified example 3 in accordance with the present invention. In the above-described first embodiment, a user defines magnification information and stores the defined magnification information in the register 1401 of the output-side image correction unit 140 or the memory unit 93 in advance. The semiconductor device 3 according to Modified example 3 is characterized in that the input-side image correction unit 220 generates magnification processing. Note that the other configuration is similar to that of the semiconductor device 1, and therefore its explanation is omitted as appropriate.

The conversion processing unit 123 of the input-side image correction unit 220 generates mapping information based on distortion correction information that is stored in the memory unit 93 and is used to correct a distortion(s) on uncorrected image date (first image data). Then, the conversion processing unit 123 performs correction processing other than magnification processing based on the mapping information.

Note that the conversion processing unit 123 generates magnification information based on the distortion correction information. Specifically, the conversion processing unit 123 extracts a magnification ratio(s) based on the distortion correction information. The conversion processing unit 123 determines whether or not the extracted magnification ratio exceeds a predetermined magnification ratio (e.g., two). Further, the conversion processing unit 123 does not magnify pixels whose magnification ratio is greater than the predetermined magnification ratio, but does generate magnification information by using the magnification ratio(s) and the addresses of the pixels. The conversion processing unit 123 stores the generated magnification information into the memory unit 93 through the shared bus 130.

Then, the output-side image correction unit 140 also reads the magnification information stored in the memory unit 93. The output-side image correction unit 140 performs magnification processing for the image data read from the memory unit 93 based on the magnification information read from the memory unit 93.

As described above, according to the configuration of the semiconductor device 3 in accordance with Modified example 3, the input-side image correction unit 220 automatically generates magnification information based on distortion correction information. Therefore, the user does not need to separately define magnification information in advance for the magnification processing performed by the output-side image correction unit 140. That is, all the information the user needs to define for distortion correction processing is distortion correction information alone. As a result, the user can save his/her trouble.

Note that the processing unit that generates magnification information is not limited to the conversion processing unit 123. Other processing units disposed in the input-side image correction unit 220 may generate magnification information. Alternatively, a processing unit for generating magnification information may be separately provided outside the input-side image correction unit 220.

<Modified Example 4>

Figure 24:
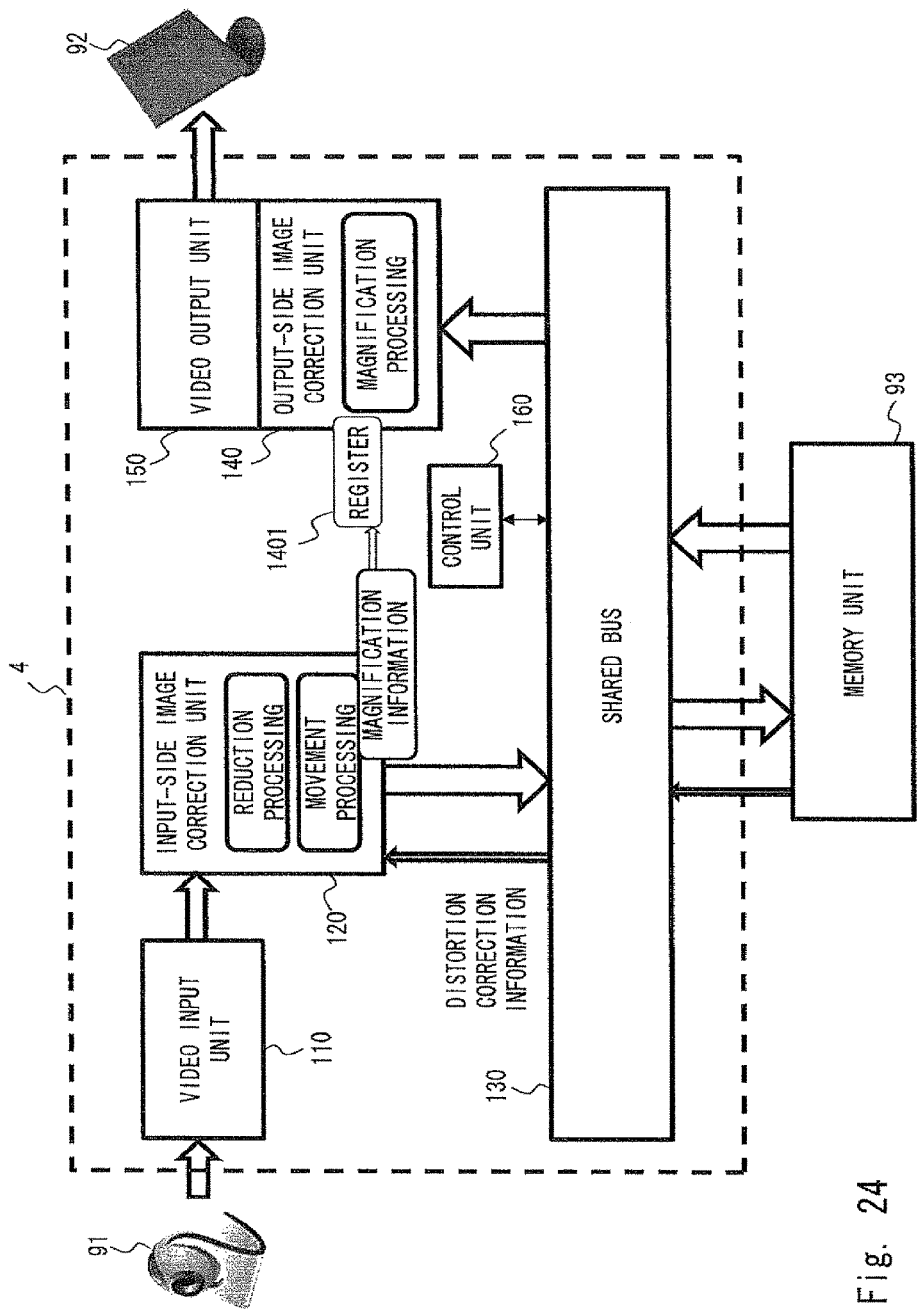
FIG. 24 is a block diagram of a semiconductor device according to Modified example 4 of a first embodiment.

Modified example 4 according to this embodiment of the present invention is explained. FIG. 24 shows a block diagram of a semiconductor device 4 according to Modified example 4 in accordance with the present invention. The semiconductor device 4 is characterized in that the input-side image correction unit 220 directly outputs generated magnification information to the output-side image correction unit 140. Note that the other configuration is similar to that of the semiconductor device 3 according to Modified example 3, and therefore its explanation is omitted as appropriate.

Specifically, the input-side image correction unit 220 stores generated magnification information into the register 1401 of the output-side image correction unit 140 without temporarily storing the magnification information into the memory unit 93. Then, the output-side image correction unit 140 performs magnification processing for image data (second image data) read from the memory unit 93 through the shared bus 130 based on the magnification information stored in the register 1401.

As described above, according to the configuration of the semiconductor device 4 in accordance with Modified example 4, since there is no need to store the magnification information into the memory unit 93, the memory cost for the memory unit 93 can be reduced. Further, since the magnification information is stored into the register 1401 by the input-side image correction unit 220, the process for reading magnification information from the memory unit 93 performed by the output-side image correction unit 140 can be also omitted. As a result, it is possible to reduce the processing burden on the output-side image correction unit 140. Needless to say, similarly to the above-described Modified example 3, since the magnification information is automatically generated by the input-side image correction unit 220, the user can save his/her trouble.

<Second Embodiment>

Figure 25:
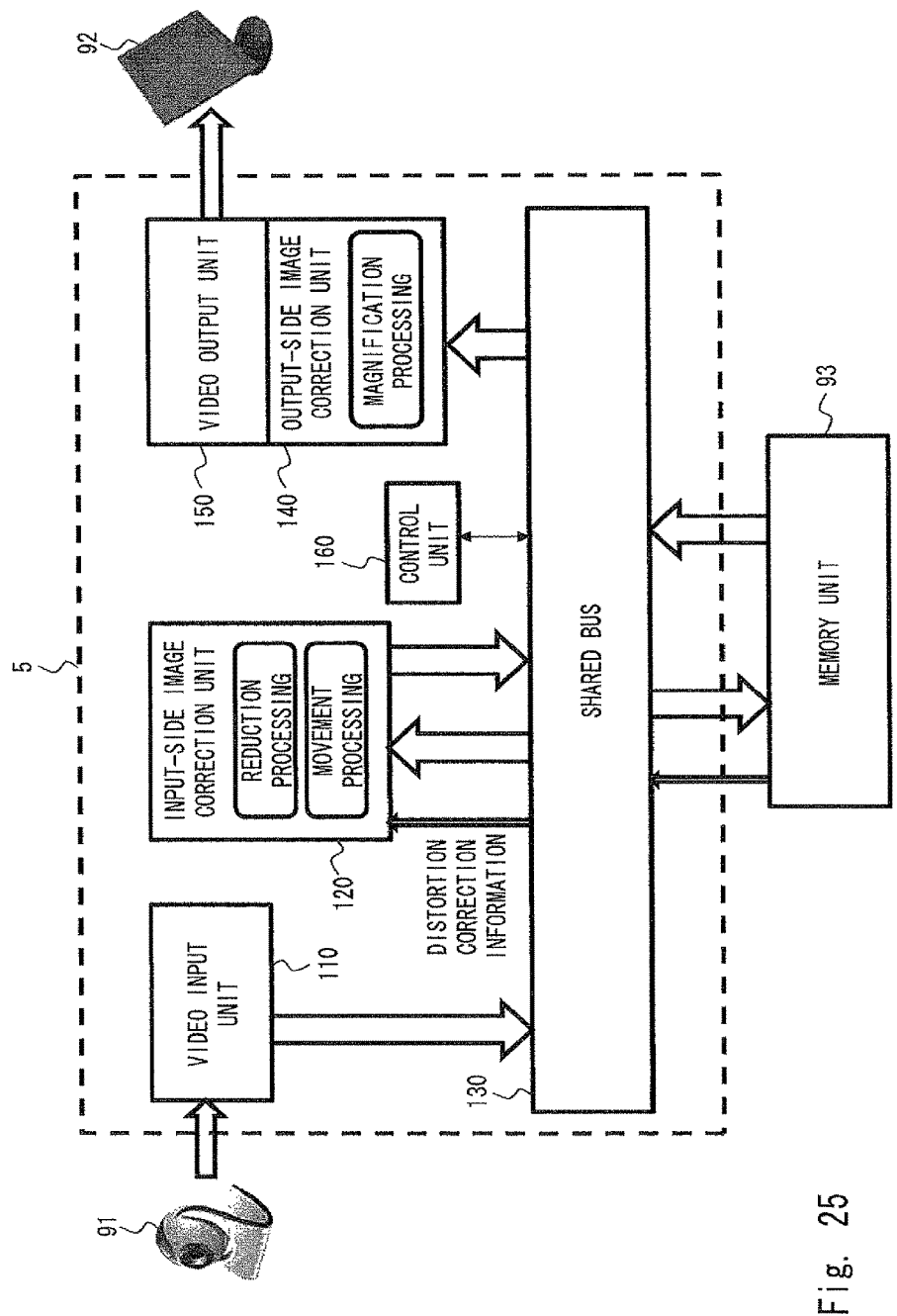
FIG. 25 is a block diagram of a semiconductor device according to a second embodiment.

A second embodiment according to the present invention is explained hereinafter with reference to the drawings. FIG. 25 shows a block diagram of a semiconductor device 5 according to this embodiment of the present invention. In the semiconductor device 5, the video input unit 110 is not directly connected to the input-side image correction unit 120. Note that the other configuration is similar to that of the semiconductor device 1, and therefore its explanation is omitted as appropriate.

The video input unit 110 does not directly output image data input from the camera 91 to the input-side image correction unit 120, but does temporarily output the image data to the memory unit 93 through the shared bus 130. That is, image data (first image data) generated by the camera 91 is stored into the memory unit 93 without being corrected for its distortion(s).

The input-side image correction unit 120 reads the image data, which has been stored in the memory unit 93 by the video input unit 110, through the shared bus 130. Further, the input-side image correction unit 120 reads distortion correction information that is stored in the memory unit 93 in advance through the shared bus 130. Then, the input-side image correction unit 120 performs reduction processing and movement processing (translation processing, rotation processing, and sheering processing) based on the distortion correction information. The input-side image correction unit 120 stores the image data (second image data), on which the correction processing has been performed, into the memory unit 93 through the shared bus 130. The subsequent processing (output-side image correction unit 140 and video output unit 150) is similar to that of the first embodiment, and therefore its explanation is omitted.

As described above, according to the configuration of the semiconductor device 5 in accordance with this embodiment, the input-side image correction unit 120 is not directly connected to the video input unit 110. Therefore, there is no need to construct the input-side image correction unit 120 and the video input unit 110 as integrated hardware. In other words, the input-side image correction unit 120 may be software that runs under the control of a CPU. By constituting the input-side image correction unit 120 as software, it is possible to simplify the configuration of the hardware of the image input unit 11 including the video input unit 110 (see FIG. 16). Further, since there is no particular restriction on the position of the input-side image correction unit 120, the design flexibility can be improved.

Needless to say, in this embodiment, the magnification processing for image data is performed in the output-side image correction unit 140 after the image data (second image data) stored in the memory unit 93 is transmitted through the shared bus 130. Therefore, no image data on which magnification processing has been already performed is transmitted through the shared bus 130. As a result, it is possible to reduce the bus band of the shared bus 130.

<Third Embodiment>

Figure 26:
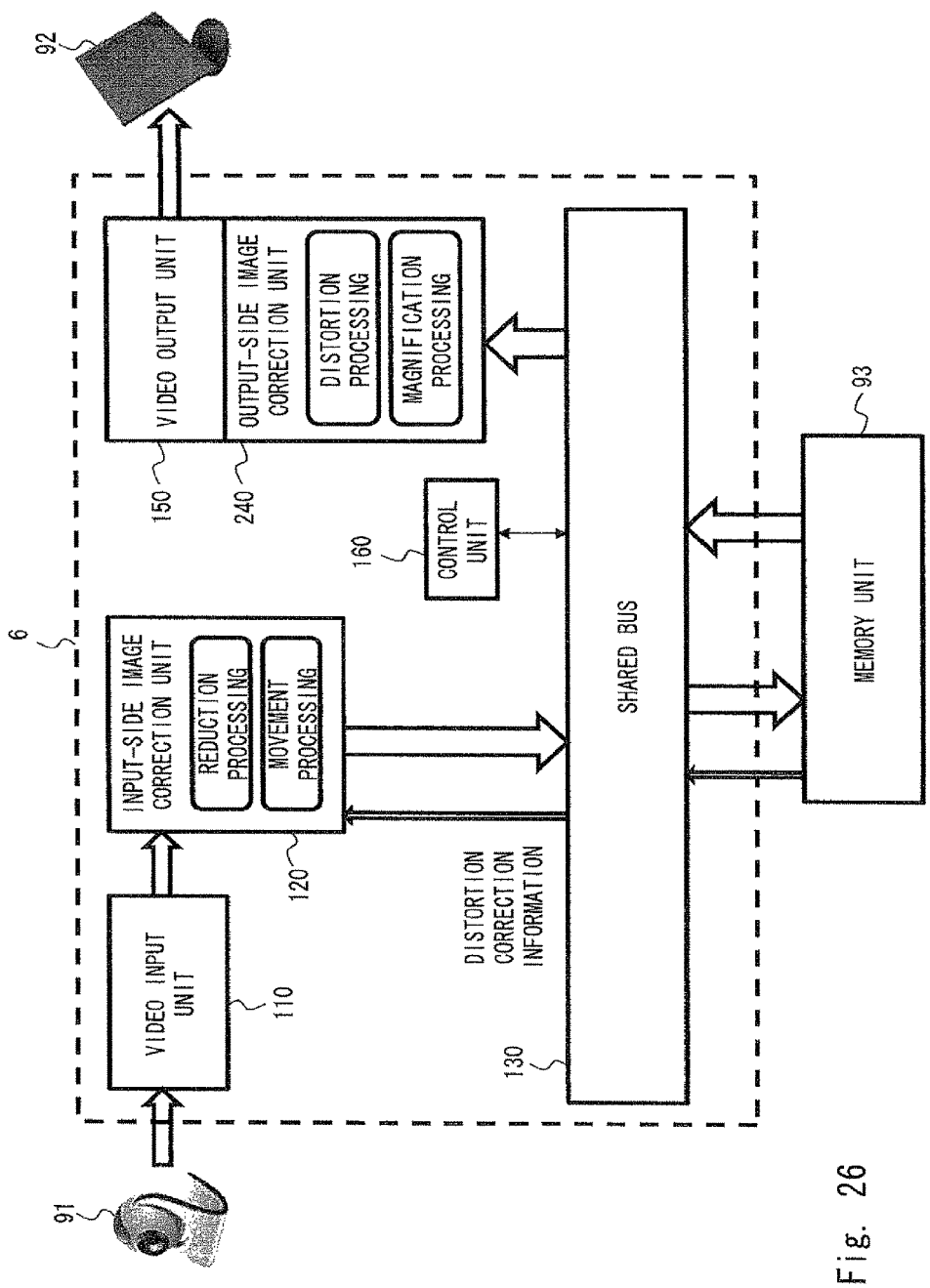
FIG. 26 is a block diagram of a semiconductor device according to a third embodiment.

A third embodiment according to the present invention is explained hereinafter with reference to the drawings. FIG. 26 shows a block diagram of a semiconductor device 6 according to this embodiment of the present invention. The configuration of the semiconductor device 6 is similar to that of the semiconductor device 1 shown in FIG. 16. However, the semiconductor device 6 is characterized in that an output-side image correction unit 240 also performs other correction processing in addition to the magnification processing. Specifically, the output-side image correction unit 240 distorts the image, whose distortion(s) has been corrected for by magnification processing, again. Note that the other configuration is similar to that of the semiconductor device 1, and therefore its explanation is omitted as appropriate.

Note that the semiconductor device 6 according to this embodiment is not a device for displaying an image(s) on a monitor 92 that is directly viewed by a user, but is a device for displaying an image(s) on, for example, a liquid-crystal panel 94 of a projecting machine such as a projector. An image(s) displayed on the liquid-crystal panel 94 is magnified and projected onto a screen, a wall, or the like. That is, the image that is viewed by a user is an image that is magnified and projected onto a screen by a projector.

Note that the image to be magnified and projected is distorted. Therefore, when the image is projected onto a plane screen, the image projected on the screen is distorted. However, when the surface onto which the image is projected is distorted, i.e., when the image is projected onto a curved screen, the image projected on the curved screen becomes an undistorted image. Therefore, for example, when an image is projected onto the windshield of a car or the like, the configuration of the semiconductor device 6 according to this embodiment can be suitably applied.

Similarly to the above-described first and second embodiments, the output-side image correction unit 240 reads image data from the memory unit 93 through the shared bus 130. Then, the output-side image correction unit 240 performs magnification processing for the read image data based on magnification information. In this way, the image data becomes distortion-corrected image data (third image data).

In addition, the output-side image correction unit 240 distorts the distortion-corrected image data (third image data) again. Specifically, the output-side image correction unit 240 performs reduction processing, magnification processing, translation processing, rotation processing, and sheering processing for distortion-corrected image data based on distortion information that is stored in the memory unit 93 in advance. In this way, the output-side image correction unit 240 distorts the image data again. Note that the distortion information is a parameter(s) that is used to distort an undistorted image. For example, the distortion information is a transformation matrix or the like for an affine-conversion that is defined in advance according to the shape and/or the curvature of a curved screen onto which the image is projected. Note that for the detailed principle for projecting an image onto a curved surface, well-known techniques can be used. Therefore, its detailed explanation is omitted.

Then, the video output unit 150 displays a distorted image (s) on the liquid-crystal panel 94 based on the distorted image data output from the output-side image correction unit 240. In this way, a distorted image(s) is displayed on the liquid-crystal panel 94. Then, the image displayed on the liquid-crystal panel 94 is magnified and projected by a projector (not shown).

As described above, according to the configuration of the semiconductor device 6 in accordance with this embodiment, the output-side image correction unit 240 distorts distortion-corrected image data (third image data) again based on distortion information. Then, the video output unit 150 displays a distorted image(s) on the liquid-crystal panel 94. Therefore, even when image data output from the semiconductor device 6 is projected on a curved screen, a user sees an undistorted image, and thus making it possible to improve the viewability of the image.

The present invention made by the inventors of the present application has been explained above in a concrete manner based on embodiments. However, the present invention is not limited to the above-described embodiments, and needless to say, various modifications and combinations can be made without departing from the spirit and scope of the present invention.

For example, only reduction processing may be performed on image data in the input-side image correction unit 120, and magnification processing, rotation processing, translation processing, and sheering processing may be performed for the image data, on which the reduction processing has been already performed, in the output-side image correction unit 140. Further, the reduction processing and part of the rotation processing, translation processing, and sheering processing may be performed in the input-side image correction unit 120, and the magnification processing and the remaining part of the rotation processing, translation processing, and sheering processing may be performed in the output-side image correction unit 140. Further, part of the magnification processing may be performed in the input-side image correction unit 120. For example, the input-side image correction unit 120 may perform magnification processing for a part of the area of the image data, and the output-side image correction unit 140 may perform magnification processing for the other area of the image data. Further, when magnification processing by a factor of four needs to be performed, for example, magnification processing by a factor of two may be performed in the input-side image correction unit 120 and another magnification processing by a factor of two may be performed in the output-side image correction unit 140.

Further, although examples in which a semiconductor device is connected to an external camera(s) 91 and a external monitor 92 are explained in the above-described embodiments, the present invention may be implemented as one electronic apparatus including an image-taking unit(s) (corresponding to camera 91), a display unit (corresponding to monitor 92), and a semiconductor device. The electronic apparatus including the image-taking unit and the display unit may be used, for example, as a car navigation apparatus.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
   an image input circuit which receives first image data distorted by an image-taking process by a camera;
   a memory control circuit which is connectable to a memory, and which writes, into the memory, the first image data for which distortion correction processing is performed based on distortion correction information; and
   an image output circuit which receives, from the memory via the memory control circuit, the first image data for which the distortion correction processing is performed, and which outputs second image data to project onto a curved screen,
   wherein the image output circuit performs, according to a shape and/or a curvature of the curved screen, distortion processing for the first image data for which the distortion correction processing is performed to generate the second image data,
   wherein the image input circuit comprises:
      a video input circuit which receives the first image data distorted by the image-taking process by the camera, the first image data including a first portion and a second portion; and
      an input image correction circuit which performs, by using reduction processing, the distortion correction processing for the first portion of the first image data, and wherein the memory control circuit writes the first image data including the first portion into the memory.

2. The semiconductor device according to claim 1,
wherein the image output circuit receives, from the memory, the first image data including the first portion and the second portion, and performs, by using magnification processing, distortion correction processing for the second portion of the first image data.

3. The semiconductor device according to claim 1,
wherein the image output circuit receives, from the memory, the first image data including the first portion and the second portion, performs, by using magnification processing, distortion correction processing for the second portion of the first image data to generate the first image data for which a distortion caused by the image-taking process by the camera is corrected, and performs the distortion processing for the first image data for which the distortion is corrected to generate the second image data.

4. The semiconductor device according to claim 1, wherein the reduction processing comprises a process for reducing pixel data included in the first portion of the first image data.

5. The semiconductor device according to claim 2, wherein the magnification processing comprises a process for adding pixel data to the second portion of the first image data.

6. The semiconductor device according to claim 1,
wherein the video input circuit receives the first image data in synchronization with a video input clock, and
wherein the input image correction circuit performs the reduction processing in synchronization with a distortion correction clock.

7. The semiconductor device according to claim 6, wherein a frequency of the distortion correction clock is less than or equal to that of the video input clock.

8. The semiconductor device according to claim 6, wherein a pulse number of the distortion correction clock used in the reduction processing is less than that of the video input clock used in receiving the first image data.

9. The semiconductor device according to claim 2,
wherein the image output circuit comprises:
an output image correction circuit which performs the magnification processing in synchronization with a display clock; and
a video output circuit which outputs the second image data to a monitor including the curved screen in synchronization with the display clock.

10. The semiconductor device according to claim 9, further comprising a bus which is coupled between the memory control circuit and the image output circuit,
wherein the image output circuit receives the first image data from the memory via the bus,
wherein the first image data is transferred on the bus in synchronization with a bus clock, and
wherein a frequency of the bus clock is less than or equal to that of the display clock.

11. The semiconductor device according to claim 9, further comprising a bus which is coupled between the memory control circuit and the image output circuit,
wherein the image output circuit receives the first image data from the memory via the bus,
wherein the first image data is transferred on the bus in synchronization with a bus clock, and
wherein a pulse number of the bus clock used in transferring the first image data on the bus is less than that of the display clock used in the magnification processing.

* * * * *